US010021536B2

United States Patent
Morita et al.

(10) Patent No.: US 10,021,536 B2
(45) Date of Patent: Jul. 10, 2018

(54) COMMUNICATION CONTROL METHOD AND USER TERMINAL FOR SELECTING A D2D SYNCHRONIZATION REFERENCE

(71) Applicant: KYOCERA CORPORATION, Kyoto (JP)

(72) Inventors: Kugo Morita, Yokohama (JP); Hiroyuki Adachi, Kawasaki (JP); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/024,969

(22) PCT Filed: Sep. 24, 2014

(86) PCT No.: PCT/JP2014/075315
§ 371 (c)(1),
(2) Date: Mar. 25, 2016

(87) PCT Pub. No.: WO2015/046264
PCT Pub. Date: Apr. 2, 2015

(65) Prior Publication Data
US 2016/0212594 A1 Jul. 21, 2016

(30) Foreign Application Priority Data
Sep. 27, 2013 (JP) ................. 2013-202767
Jan. 29, 2014 (JP) ................. 2014-014915

(51) Int. Cl.
H04L 12/18 (2006.01)
H04W 4/06 (2009.01)
(Continued)

(52) U.S. Cl.
CPC ........... H04W 4/06 (2013.01); H04L 12/1881 (2013.01); H04L 67/104 (2013.01); H04W 4/70 (2018.02);
(Continued)

(58) Field of Classification Search
CPC . H04W 4/005; H04W 72/10; H04W 72/1242; H04W 72/1247; H04L 67/104;
(Continued)

(56) References Cited

U.S. PATENT DOCUMENTS

2013/0028177 A1* 1/2013 Koskela .................. H04W 4/70
370/328
2013/0077512 A1 3/2013 Chang et al.
(Continued)

FOREIGN PATENT DOCUMENTS

JP 2010-056955 A 3/2010
JP 2011-176549 A 9/2011
(Continued)

OTHER PUBLICATIONS

R1-133143, "D2D discovery and synchronization based on clusters", Aug. 19-23, 2013.*
R1-133143, "D2D discovery and synchronization based clusters", Aug. 19-23, 2013.*
R1-132503, "Techniques for D2D discovery", May 20-24, 2013.*
Office Action dated Dec. 13, 2016 in corresponding Japanese Patent Application No. 2015-539274 with Concise Statement of Relevance; 5pp.
(Continued)

Primary Examiner — Salvador E Rivas
(74) Attorney, Agent, or Firm — Studebaker & Brackett PC

(57) ABSTRACT

D2D communication is appropriately controlled even in an environment in which a user terminal inside the coverage and a user terminal outside the coverage both exist. A method includes: a step of receiving, by UE 100-1 included in a plurality of UEs 100, from UE 100-n included in the plurality of UEs 100, information related to the UE 100-n; and a step of selecting, by the UE 100-1, a control user terminal for controlling D2D communication, based on the information related to the UE 100-n, from among the plurality of UEs 100.

3 Claims, 19 Drawing Sheets

(51) Int. Cl.
| | |
|---|---|
| *H04L 29/08* | (2006.01) |
| *H04W 72/10* | (2009.01) |
| *H04W 72/12* | (2009.01) |
| *H04W 52/02* | (2009.01) |
| *H04W 8/00* | (2009.01) |
| *H04W 56/00* | (2009.01) |
| *H04W 4/70* | (2018.01) |
| *H04W 76/14* | (2018.01) |

(52) U.S. Cl.
CPC ....... *H04W 8/005* (2013.01); *H04W 52/0216* (2013.01); *H04W 52/0219* (2013.01); *H04W 56/0015* (2013.01); *H04W 72/10* (2013.01); *H04W 72/1242* (2013.01); *H04W 76/14* (2018.02); *Y02D 70/00* (2018.01); *Y02D 70/1242* (2018.01); *Y02D 70/1262* (2018.01); *Y02D 70/164* (2018.01); *Y02D 70/21* (2018.01)

(58) Field of Classification Search
CPC ........... H04L 29/08306; H04L 12/1881; H04L 47/6275; H04B 7/2693
See application file for complete search history.

(56) References Cited

U.S. PATENT DOCUMENTS

| | | | | |
|---|---|---|---|---|
| 2013/0100895 A1* | 4/2013 | Aghili | ..................... | H04W 4/00 370/329 |
| 2015/0249937 A1* | 9/2015 | Lindoff | ............. | H04W 36/0011 370/331 |
| 2016/0020890 A1* | 1/2016 | Sirotkin | ................ | H04W 76/00 370/352 |
| 2016/0037466 A1* | 2/2016 | Yang | ..................... | H04W 48/14 370/350 |
| 2016/0173262 A1* | 6/2016 | Davydov | .............. | H04W 36/32 370/329 |
| 2016/0212594 A1 | 7/2016 | Morita et al. | | |

FOREIGN PATENT DOCUMENTS

| | | |
|---|---|---|
| JP | 2012-015879 A | 1/2012 |
| WO | 2015/046264 A1 | 4/2015 |

OTHER PUBLICATIONS

LG Electronics; "Enhancements for Efficient Relaying Operations"; 3GPP TSG RAN WG1 Meeting #74; R1-13386; Barcelona, Spain; Aug. 19-23, 2013; 6pp.

Huawei, HiSilicon; "RAN2 considerations for D2D communication"; 3GPP TSG RAN WG1 Meeting #83; R2-132757; Barcelona, Spain; Aug. 19-23, 2013; 10pp.

An Office Action issued by the Japanese Patent Office dated Aug. 9, 2016, which corresponds to Japanese Patent Application No. 2015-539274 and is related to U.S. Appl. No. 15/024,969; with English language statement of relevance.

Intel Corporation; "D2D Synchronization—Out of network coverage/partial network coverage"; 3GPP TSG RAN WG1 Meeting #74; R1-133496; Aug. 19-23, 2013; pp. 1-5; Barcelona, Spain.

International Search Report of PCT/JP2014/075315 dated Dec. 9, 2014.

Written Opinion of PCT/JP2014/075315 dated Dec. 9, 2014.

3rd Generation Partnership Project; Technical Specification Group Services and System Aspects; Feasibility study for Proximity Services (ProSe); 3GPP TR 22.803; V12.2.0; Jun. 2013; pp. 1-45; Release 12; 3GPP Organizational Partners.

Fujitsu; D2D Discovery and Synchronization Based on Clusters; 3GPP TSG-RAN1 #74; R1-133143: Aug. 19-23, 2013; pp. 1-7; Barcelona, Spain.

Intel Corporation; Discussion on Synchronization Options for D2D Operation; 3GPP TSG RAN WG1 Meeting #74; R1-133162; Aug. 19-23, 2013; pp. 1-5; Barcelona, Spain.

Intel Corporation; D2D Discovery Design for Public Safety and General Scenarios; 3GPP TSG WG1 Meeting #74; R1-132941; Aug. 19-23, 2013; pp. 1-7; Barcelona, Spain.

An Office Action; "Notice of Reasons for Rejection," issued by the Japanese Patent Office dated Aug. 1, 2017, which corresponds to Japanese Patent Application No. 2017-113492 and is related to U.S. Appl. No. 15/024,969; with English language statement of relevance.

An Office Action issued by the Japanese Patent Office dated Mar. 21, 2017, which corresponds to Japanese Patent Application No. 2015-539274 and is related to U.S. Appl. No. 15/024,969; with English language concise explanation; 5pp.

CATT; "D2D communication solutions"; 3GPP TSG RAN WG2 Meeting #83 R2-132534; Barcelona, Spain; Aug. 18-23, 2013; 8pp.

* cited by examiner

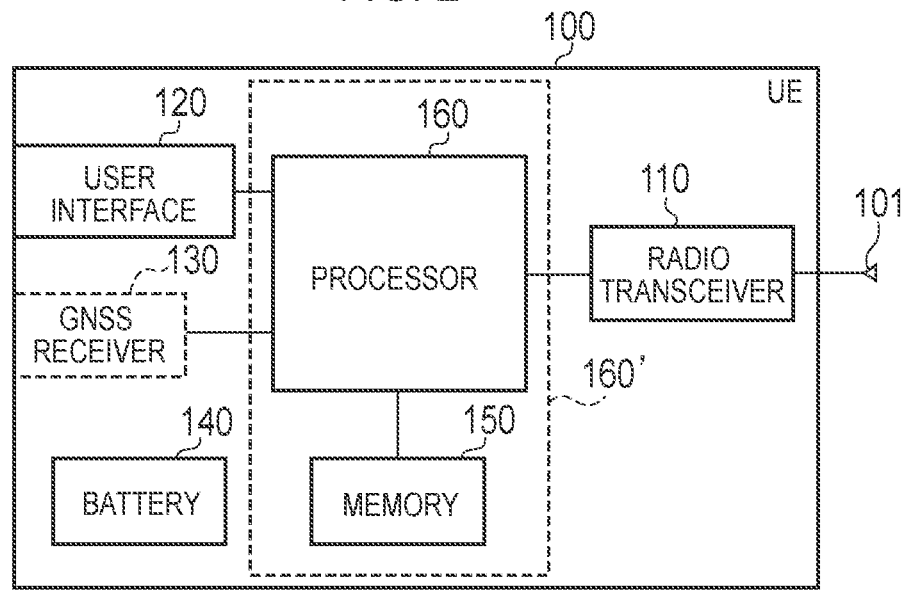
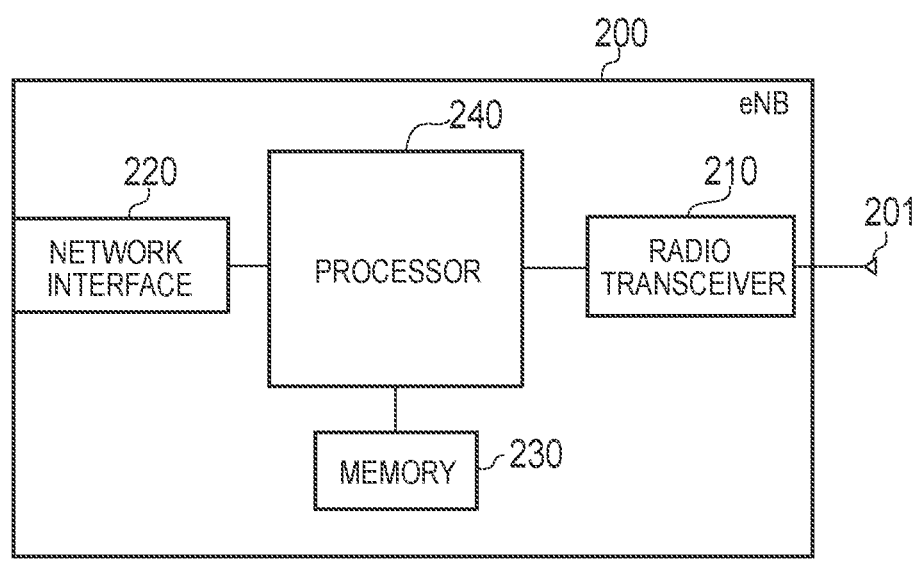

COMMUNICATION CONTROL METHOD AND USER TERMINAL FOR SELECTING A D2D SYNCHRONIZATION REFERENCE

TECHNICAL FIELD

The present invention relates to a communication control method and a user terminal that are used in a mobile communication system supporting D2D communication.

BACKGROUND ART

In the 3rd Generation Partnership Project (3GPP), which is a standardization project for a mobile communication system, the introduction of terminal-to-terminal (Device to Device: D2D) communication is considered as a new function launched from the release 12 (refer to Non Patent Literature 1).

In D2D communication, direct terminal-to-terminal communication is performed not via a network, within a terminal group including a plurality of closely-located user terminals. On the other hand, in cellular communication, which is normal communication of a mobile communication system, a user terminal performs communication via a network.

In the D2D communication, since radio communication with low transmission power can be performed between closely-located user terminals, the power consumption of the user terminals and the load on the network can be reduced as compared with the cellular communication.

CITATION LIST

Non Patent Literature

Non Patent Literature 1: 3GPP Technical Report "TR 22.803 V12.2.0" June 2013

SUMMARY OF INVENTION

D2D communication is assumed to be allowed even for a terminal group at least part of which includes a user terminal outside the coverage of a mobile communication system.

Thus, an object of the present invention is to provide a communication control method and a user terminal that can appropriately control D2D communication even in an environment in which a user terminal inside the coverage and a user terminal outside the coverage both exist.

A communication control method according to a first aspect is used in a mobile communication system supporting D2D communication performed by a plurality of user terminals. The communication control method includes: a step A of receiving, by a user terminal included in the plurality of user terminals, from another user terminal included in the plurality of user terminals, information related to the another user terminal; and a step B of selecting, by the user terminal, a control user terminal for controlling D2D communication, based on the information related to the another user terminal, from among the plurality of user terminals.

A user terminal according to a second aspect supports D2D Proximity Service for enabling direct terminal-to-terminal communication that is performed not via a network. The user terminal includes: a storage configured to store D2D resource information indicating radio resource usable for the D2D Proximity Service; and a controller configured to, in a case in which the user terminal itself becomes a D2D synchronization source on outside of a coverage of the network, transmit the D2D resource information stored by the storage, by broadcast. In a case in which the user terminal itself becomes a D2D un-synchronization source performing synchronization with the D2D synchronization source, the controller rewrites the D2D resource information stored by the storage, using the D2D resource information received from the D2D synchronization source.

A user terminal according to a third aspect supports D2D Proximity Service for enabling direct terminal-to-terminal communication that is performed not via a network. The user terminal includes: a receiver configured to receive broadcast synchronization information multi-hop transferred from a D2D synchronization source; and a controller configured to transfer transmission broadcast synchronization information corresponding to the received broadcast synchronization information, to another user terminal. The controller applies a transmission parameter different from a transmission parameter applied to the received broadcast synchronization information, to the transmission broadcast synchronization information. The transmission parameter is at least either one of a signal sequence or time and frequency resources.

BRIEF DESCRIPTION OF DRAWINGS

FIG. 2 is a block diagram of a user equipment (UE) according to the first and second embodiments.

FIG. 3 is a block diagram of an evolved Node-B (eNB) according to the first and second embodiments.

DESCRIPTION OF EMBODIMENTS

Overview of Embodiments

Figure 1:
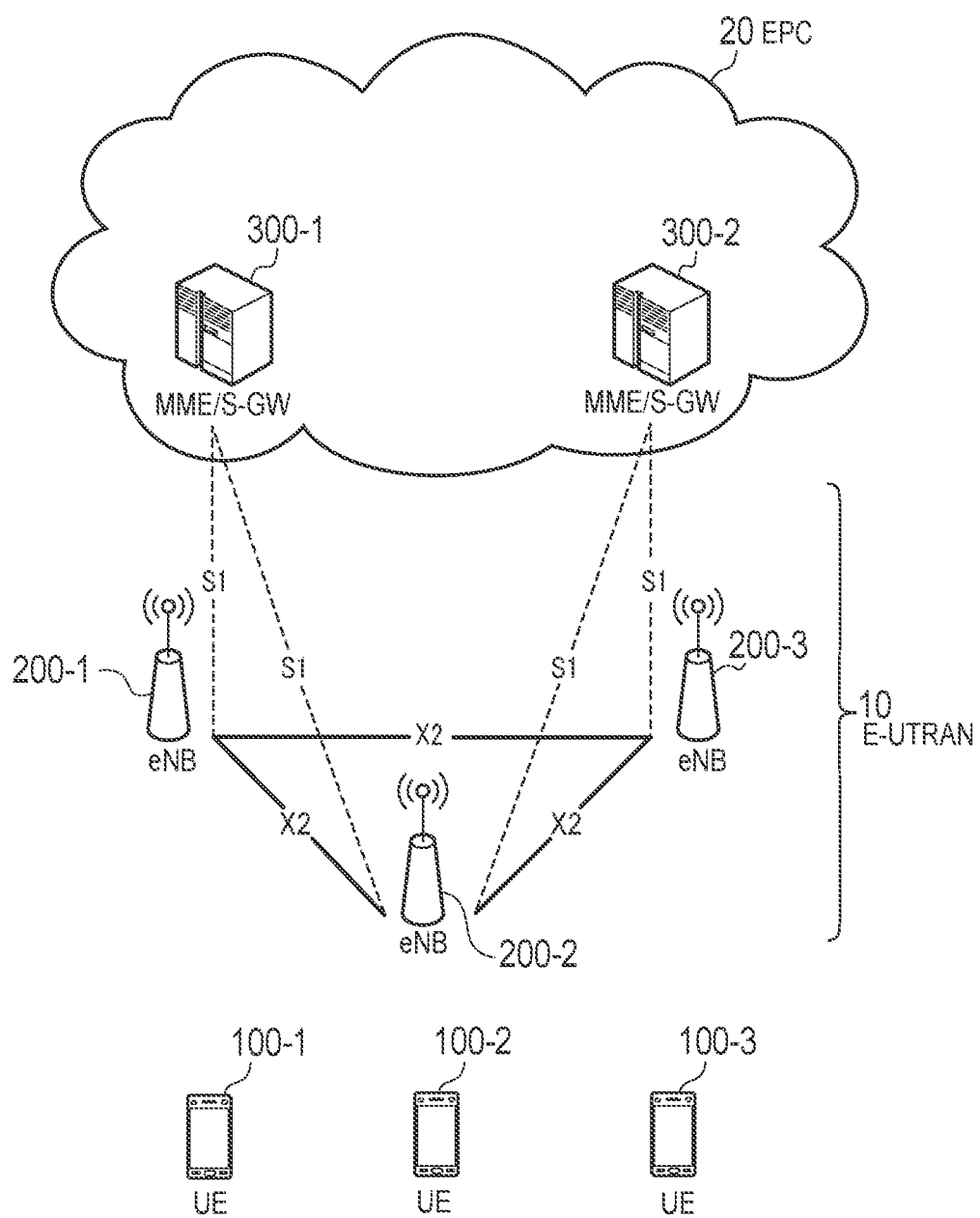
FIG. 1 is a configuration diagram of a Long Term Evolution (LTE) system according to first and second embodiments.

A communication control method according to first to fourth embodiments is used in a mobile communication system supporting D2D communication performed by a plurality of user terminals. The communication control method includes: a step A of receiving, by a user terminal included in the plurality of user terminals, from another user terminal included in the plurality of user terminals, information related to the another user terminal; and a step B of selecting, by the user terminal, a control user terminal for controlling D2D communication, based on the information related to the another user terminal, from among the plurality of user terminals.

In the first and second embodiments, the information related to the another user terminal is D2D usable resource information related to radio resource usable by the another user terminal in D2D communication.

In the first and second embodiments, in the step B, the user terminal selects the control user terminal based on respective D2D usable resources of the plurality of user terminals, to mitigate interference to cellular communication that is caused by D2D communication.

In the first and second embodiments, in the step B, the user terminal selects, from among the plurality of user terminals, a user terminal having relatively small radio resource usable in D2D communication, as the control user terminal.

In the first and second embodiments, in the step A, the user terminal further receives, from the another user terminal, coverage related information as to whether the another user terminal is in coverage of the mobile communication system. In the step B, the user terminal selects the control user terminal from among the plurality of user terminals based on the D2D usable resource information and the coverage related information.

In the first and second embodiments, in the step A, the user terminal further receives, from the another user terminal, power source related information related to power source used by the another user terminal. In the step B, the user terminal selects the control user terminal from among the plurality of user terminals based on the D2D usable resource information, the coverage related information, and the power source related information.

In the first and second embodiments, at least one of the D2D usable resource information, the coverage related information, and the power source related information is included in a discovery signal used for discovery of neighboring user terminal.

In the first and second embodiments, in the step B, in a case in which all of the plurality of user terminals is in the coverage, or all of the plurality of user terminals is outside the coverage, the user terminal selects a user terminal having power source of which drivable time is relatively long, as the control user terminal, from among the plurality of user terminals.

In the first and second embodiments, the communication control method further includes a step C of transmitting, by the control user terminal selected from among the plurality of user terminals, a broadcast signal for D2D communication. The broadcast signal includes at least one of: a synchronization signal for synchronizing the plurality of user terminals; D2D usable resource information related to radio resources usable by the control user terminal in D2D communication; information about allocated resource allocated from among the usable radio resources; and information indicating radio resource usable for transmitting a request for participation in terminal group.

In the second embodiment, in a case in which a terminal group for performing D2D communication is not formed, the steps A and B are performed when the terminal group is formed.

In the second embodiment, in a case in which a terminal group for performing D2D communication is formed, when a new user terminal participates in the terminal group, the steps A and B are performed.

In the second embodiment, in a case in which a terminal group for performing D2D communication is formed, when it is checked that a part of user terminals forming the terminal group has left, the steps A and B are performed.

In the second embodiment, the communication control method further includes a step D of controlling, by the user terminal, a transmission timing at which a discovery signal is transmitted, and a monitoring timing at which a discovery signal transmitted from another user terminal is monitored, in a case in which a terminal group for performing D2D communication is not formed. In the step D, the user terminal controls the transmission timing and the monitoring timing based on a synchronization signal or a reference signal that is transmitted from a base station, or an operation timing set by the user terminal itself.

In the second embodiment, the communication control method further includes a step of transmitting, by the user terminal, in a case in which the discovery signal is received at the monitoring timing, a request for participation in a terminal group, at a timing that is based on a reception timing of the discovery signal.

In the second embodiment, first radio resource usable for transmitting the discovery signal is predefined. The communication control method further includes a step of monitoring, by the user terminal, in a case in which second radio resource usable for transmitting the discovery signal is allowed from a base station in a case in which a terminal group for performing D2D communication is not formed, the discovery signal at the monitoring timing for each of the first and second radio resources.

In the third and fourth embodiments, the control user terminal is a D2D synchronization source. The information related to the another user terminal is priority information of the another user terminal that indicates a degree of suitability for the D2D synchronization source.

A user terminal according to first to fourth embodiments is included in a plurality of user terminals in a mobile communication system supporting D2D communication performed by the plurality of user terminals. The user terminal includes: a receiver configured to receive, from another user terminal included in the plurality of user terminals, information related to the another user terminal; and a controller configured to select a control user terminal for controlling D2D communication, based on the information related to the another user terminal, from among the plurality of user terminals.

A user terminal according to the third embodiments supports D2D Proximity Service for enabling direct terminal-to-terminal communication that is performed not via a network. The user terminal includes: a storage configured to store D2D resource information indicating radio resource usable for the D2D Proximity Service; and a controller configured to, in a case in which the user terminal itself becomes a D2D synchronization source on outside of a coverage of the network, transmit the D2D resource information stored by the storage, by broadcast. In a case in which the user terminal itself becomes a D2D un-synchronization source performing synchronization with the D2D synchronization source, the controller rewrites the D2D resource information stored by the storage, using the D2D resource information received from the D2D synchronization source.

In the third embodiment, the user terminal further includes a receiver configured to receive, from another user terminal, priority information indicating a degree of suitability for the D2D synchronization source. The controller determines whether to set the another user terminal as the D2D synchronization source or set the user terminal itself as the D2D synchronization source, by comparing the received priority information with predetermined information.

In the third embodiment, the predetermined information is priority information of the user terminal itself or a reference value acquired from the network.

In the third embodiment, the user terminal further includes a transmitter configured to transmit, by broadcast, priority information of the user terminal itself that indicates a degree of suitability for the D2D synchronization source. The priority information of the user terminal itself is based on at least one of a specification of the user terminal itself, a movement state of the user terminal itself, and reliability of the D2D resource information stored in the storage.

A method according to the third embodiments is a method in a user terminal supporting D2D Proximity Service for enabling direct terminal-to-terminal communication that is performed not via a network. The method includes: a step of storing D2D resource information indicating radio resource usable for the D2D Proximity Service; a step of, in a case in which the user terminal itself becomes a D2D synchronization source on outside of a coverage of the network, transmitting the D2D resource information stored by the storage, by broadcast; and in a case in which the user terminal itself becomes a D2D un-synchronization source performing synchronization with the D2D synchronization source, rewriting the D2D resource information stored by the storage, using the D2D resource information received from the D2D synchronization source.

A user terminal according to the fourth embodiment supports D2D Proximity Service for enabling direct terminal-to-terminal communication that is performed not via a network. The user terminal includes: a receiver configured to receive broadcast synchronization information multi-hop transferred from a D2D synchronization source; and a controller configured to transfer transmission broadcast synchronization information corresponding to the received broadcast synchronization information, to another user terminal. The controller applies a transmission parameter different from a transmission parameter applied to the received broadcast synchronization information, to the transmission broadcast synchronization information. The transmission parameter is at least either one of a signal sequence or time and frequency resources.

In the fourth embodiment, the transmission parameter is associated with a hop number of the broadcast synchronization information from the D2D synchronization source. The received broadcast synchronization information includes information about a hop number from the D2D synchronization source. The controller applies the transmission parameter corresponding to the information about the hop number, to the transmission broadcast synchronization information.

In the fourth embodiment, the controller decides the transmission parameter to be applied to the transmission broadcast synchronization information, by scanning broadcast synchronization information transmitted from another user terminal.

A method according to the fourth embodiment is a method in a user terminal supporting D2D Proximity Service for enabling direct terminal-to-terminal communication that is performed not via a network. The method includes: a step of receiving broadcast synchronization information multi-hop transferred from a D2D synchronization source; and a step of performing control to transfer transmission broadcast synchronization information corresponding to the received broadcast synchronization information, to another user terminal. The step of performing control includes a step of applying a transmission parameter different from a transmission parameter applied to the received broadcast synchronization information, to the transmission broadcast synchronization information. The transmission parameter is at least either one of a signal sequence or time and frequency resources.

First Embodiment

An embodiment in which the present invention is applied to an LTE system will be described below.

(System Configuration)

FIG. 1 is a configuration diagram of an LTE system according to a first embodiment. As illustrated in FIG. 1, the LTE system according to the first embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell) formed by the eNB 200. The configuration of the UE 100 will be described later.

The E-UTRAN 10 corresponds to a radio access network. The E-UTRAN 10 includes eNB 200 (an evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function for user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 corresponds to storage, and the processor 160 corresponds to a controller. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal and transmits the radio signal from the antenna 101. Furthermore, the radio transceiver 110 converts a radio signal received by the antenna 101 into a baseband signal (a reception signal) and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100 and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

FIG. 3 is a block diagram of the eNB 200. As illustrated in FIG. 3, the eNB 200 includes a plurality of antennas 201, a radio transceiver 210, a network interface 220, a memory 230, and a processor 240.

The antenna 201 and the radio transceiver 210 are used to transmit and receive a radio signal. The radio transceiver 210 converts a baseband signal (a transmission signal) output from the processor 240 into a radio signal and transmits the radio signal from the antenna 201. Furthermore, the radio transceiver 210 converts a radio signal received by the antenna 201 into a baseband signal (a reception signal) and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
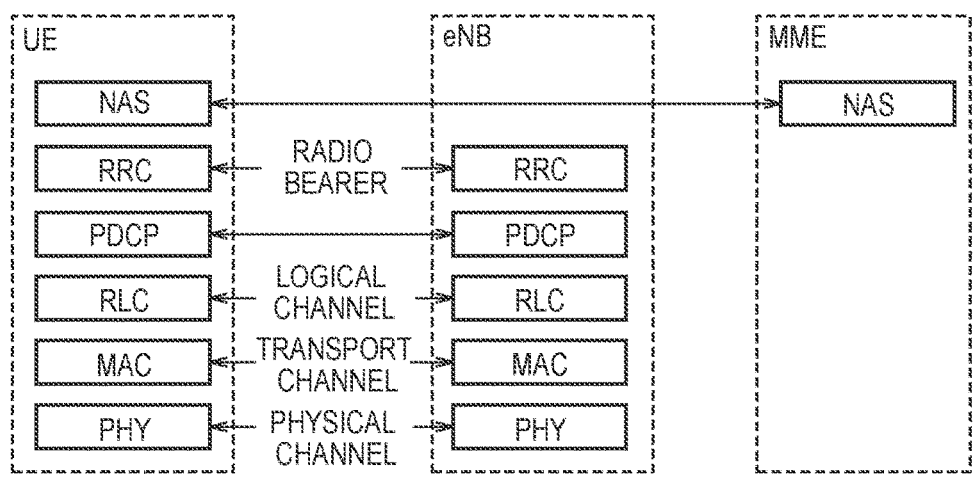
FIG. 4 is a protocol stack diagram of a radio interface according to the first and second embodiments.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), and the like. Between the MAC layer of the UE 100 and the MAC layer of the eNB 200, user data and control signals are transmitted via a transport channel. The MAC layer of the eNB 200 includes a scheduler for determining (scheduling) a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in a connected state (RRC connected state). Otherwise, the UE 100 is in an idle state (RRC idle state).

An NAS (Non-Access Stratum) layer positioned above the RRC layer performs session management, mobility management and the like.

Figure 5:
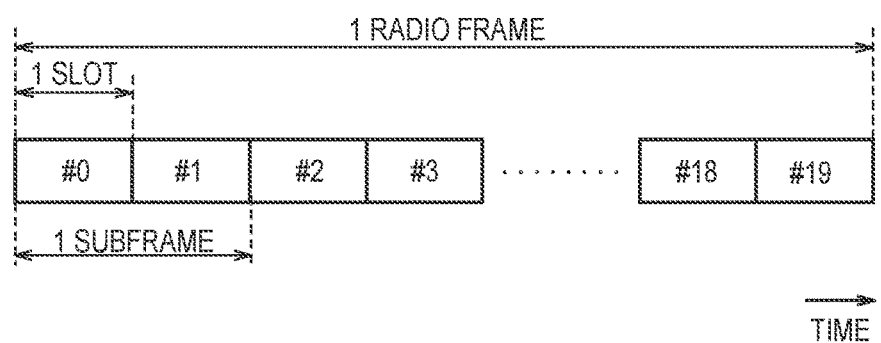
FIG. 5 is a configuration diagram of a radio frame according to the first and second embodiments.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction.

Of the radio resources (time and frequency resources) assigned to the UE 100, a frequency resource can be identified by a resource block and a time resource can be identified by a subframe (or a slot).

In the downlink, an interval of several symbols at the head of each subframe is a region used as a physical downlink control channel (PDCCH) for mainly transmitting a control signal. Furthermore, the remaining interval of each subframe is a region available as a physical downlink shared channel (PDSCH) for mainly transmitting user data.

In the uplink, both ends in the frequency direction of each subframe are regions used as a physical uplink control channel (PUCCH) for mainly transmitting a control signal. The remaining portion in each subframe is a region available as a physical uplink shared channel (PUSCH) for mainly transmitting user data.

(D2D Communication)

Figure 6:
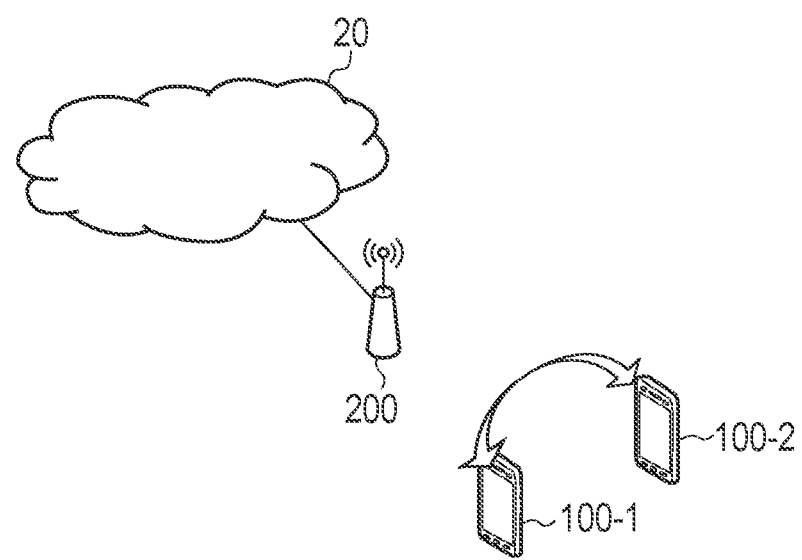
FIG. 6 is a diagram illustrating D2D communication according to the first and second embodiments.

The LTE system according to the first embodiment supports D2D communication, which is direct terminal-to-terminal communication (UE-to-UE communication). FIG. 6 is a diagram illustrating D2D communication according to the first embodiment.

The description will now be given based on the comparison between D2D communication and cellular communication, which is normal communication of the LTE system. The cellular communication is a communication mode in which a data path passes through a network (E-UTRAN 10, EPC 20). The data path is a transfer path of user data.

On the other hand, as illustrated in FIG. 6, D2D communication is a communication mode in which a data path set between UEs does not pass through a network. A plurality of UEs 100 (UEs 100-1 and 100-2) located close to each other directly performs radio communication with low transmission power.

Since the plurality of closely-located UEs 100 directly performs radio communication with low transmission power in this manner, the power consumption of the UEs 100 can be reduced and the interference with adjacent cells can be mitigated, as compared with cellular communication. In addition, in first and second embodiments, D2D communication may include a discovery process (Discovery) to be described later.

(Operation According to First Embodiment)

(1) Operation Environment

Figure 7:
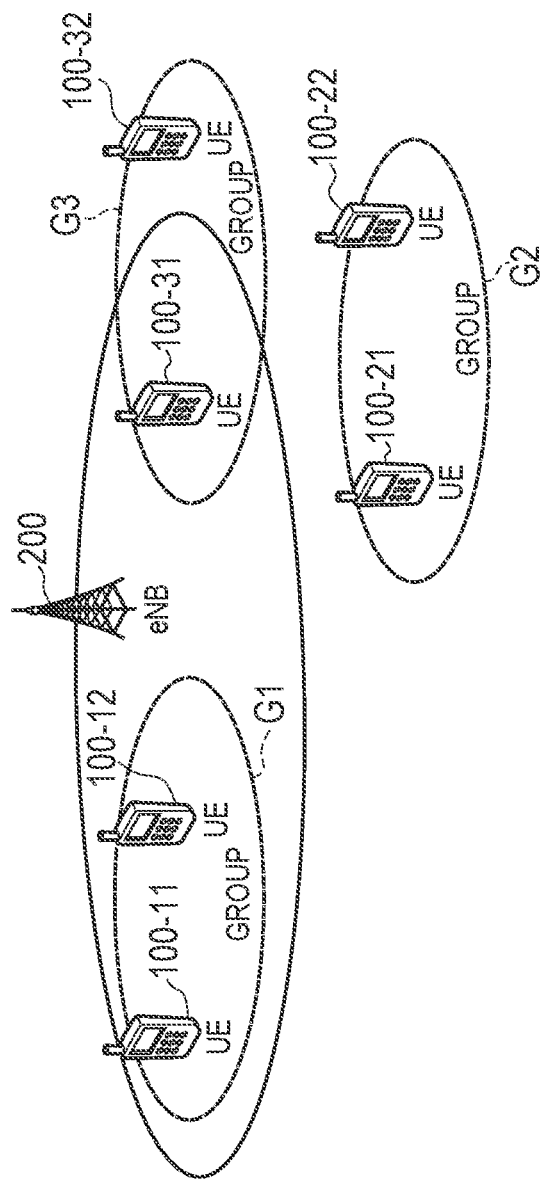
FIG. 7 is a diagram illustrating an operation environment according to the first embodiment.

FIG. 7 is a diagram illustrating an operation environment according to the first embodiment. In FIG. 7, terminal groups for performing D2D communication (hereinafter, referred to as "D2D groups") are each formed by two UEs 100. Nevertheless, the number of UEs 100 forming one D2D group may be three or more.

As illustrated in FIG. 7, D2D groups G1 to G3 are formed.

The D2D group G1 is a D2D group formed by UEs 100-11 and 100-12 inside the coverage of the eNB 200 (hereinafter, briefly referred to as "coverage"). Hereinafter, a case in which UEs 100 forming a D2D group are each positioned inside the coverage will be referred to as "in coverage".

The D2D group G2 is a D2D group formed by UEs 100-21 and 100-22 outside the coverage. Hereinafter, a case in which UEs 100 forming a D2D group are each positioned outside the coverage will be referred to as "out of coverage".

The D2D group G3 is a D2D group formed by a UE 100-31 inside the coverage and a UE 100-32 outside the coverage. Hereinafter, a case in which a part of UEs 100 in a D2D group is positioned inside the coverage and a remaining UE 100 is positioned outside the coverage will be referred to as "partial coverage".

In this manner, three types of cases are assumed for D2D groups. It is therefore desired that D2D communication can be controlled using a method common to these three types of cases.

In addition, in a case in which a UE 100 that cannot be controlled by the eNB 200 exists in a D2D group, as in the out of coverage case and the partial coverage case, it is desired that a control UE (control user terminal) for controlling D2D communication inside the D2D group is selected, and D2D communication is controlled by the control UE.

The control UE allocates radio resource (frequency, time) to a UE 100 included in the D2D group, from among radio resources usable in D2D communication (hereinafter, referred to as "D2D usable resources"). Here, as for a UE 100 inside the coverage, a D2D usable resource is specified from the eNB 200 to prevent the interference with cellular communication. On the other hand, as for a UE 100 outside the coverage, a D2D usable resource is not specified. Thus, all radio resources can be set as D2D usable resources.

In addition, the control UE may relay data transmitted and received between UEs 100 included in the D2D group. Furthermore, the control UE may be a synchronization reference (D2D synchronization source) of the UEs 100 included in the D2D group. The first embodiment assumes a communication mode in which the control UE relays data transmitted and received between the UEs 100 included in the D2D group. Thus, the control UE needs to exist also in the "in coverage case".

(2) Operation Overview

A communication control method according to the first embodiment is used in a mobile communication system supporting D2D communication performed by a plurality of UEs 100. The communication control method includes a step A of receiving, by a UE 100-1 included in the plurality of UEs 100, from another UE 100-$n$ included in the plurality of UEs 100, D2D usable resource information related to a D2D usable resource of the other UE 100-$n$, and a step B of selecting, by the UE 100-1, a control UE for controlling D2D communication, based on the D2D usable resource information, from among the plurality of UEs 100. The D2D usable resource information is an identifier of each of frequency resources (resource block, frequency band, etc.) constituting a D2D usable resource, and/or an identifier of each of time resources (subframe, radio frame, etc.) constituting the D2D usable resource. Alternatively, the D2D usable resource information may be the number of frequency resources constituting the D2D usable resource, and/or the number of time resources constituting the D2D usable resource.

With this configuration, when a UE 100 for which a D2D usable resource is specified is included in the plurality of UEs 100, the control UE can be selected in consideration of the specified D2D usable resource. In addition, in the first embodiment, in the step B, the UE 100-1 selects the control UE so as to mitigate the interference to cellular communication that is caused by D2D communication. For example, in the step B, by selecting a UE 100 having a relatively small D2D usable resource, as the control UE, the interference between D2D communication and cellular communication can be effectively prevented.

In the first embodiment, in the step A, the UE 100-1 further receives, from the other UE 100-$n$, coverage related information as to whether the other UE 100-$n$ is inside a coverage of the mobile communication system. In the step B, the UE 100 selects the control UE from among the plurality of UEs 100 based on the D2D usable resource information and the coverage related information. The coverage related information may include a cell identifier of a cell (or an identifier of an eNB) in which the other UE 100-$n$ exists.

With this configuration, the control UE can be selected considering which of the "in coverage case", the "out of coverage case", and the "partial coverage case" a corresponding case falls into.

In the first embodiment, in the step A, the UE 100-1 further receives, from the other UE **100-*n*, power source related information related to a power source used by the other UE 100-*n*. In the step B, the UE 100-1 selects the control UE from among the plurality of UEs 100** based on the D2D usable resource information, the coverage related information, and the power source related information. The power source related information is information indicating the type of a power source (an alternating current (AC) power, a battery, etc.), and/or the amount of power that can be supplied from the power source (battery remaining amount, etc.).

With this configuration, the control UE can be selected in consideration of a drivable time defined according to the type and the state of the power source.

In addition, at least one of the D2D usable resource information, the coverage related information, and the power source related information may be included in a discovery signal used for discovery of a neighboring UE 100 (hereinafter, referred to as "discovery signal"). With this configuration, a process of forming a D2D group and a process of selecting a control UE can partially share a common process. This can enhance the efficiency.

In the first embodiment, in the step B, in a case in which all of the plurality of UEs 100 is inside the coverage, or all of the plurality of UEs 100 is outside the coverage, the UE 100-1 selects a UE 100 having a power source of which a drivable time is relatively long, as the control UE, from among the plurality of UEs 100. As a result, a UE 100 with a short drivable time can be prevented from becoming undrivable (operation stop).

In the first embodiment, the communication control method further includes a step C of transmitting, by the control UE selected from among the plurality of UEs 100, a broadcast signal (broadcast information) for D2D communication. The broadcast signal includes D2D usable resource information related to D2D usable resources of the control UE. Each UE 100 included in the D2D group performs D2D communication within a range of the D2D usable resources of the control UE. Alternatively, the broadcast signal may include information indicating an allocated resource allocated from among the usable radio resources. In addition, the broadcast signal may include a synchronization signal for performing synchronization between the plurality of UEs 100. Furthermore, the broadcast signal may include information indicating radio resource usable for transmitting a request for participation in the D2D group. With this configuration, the control UE can appropriately control the D2D group.

(3) Operation Specific Example

Next, a specific example of an operation according to the first embodiment will be described.

(3.1) Operation Flow

Figure 8:
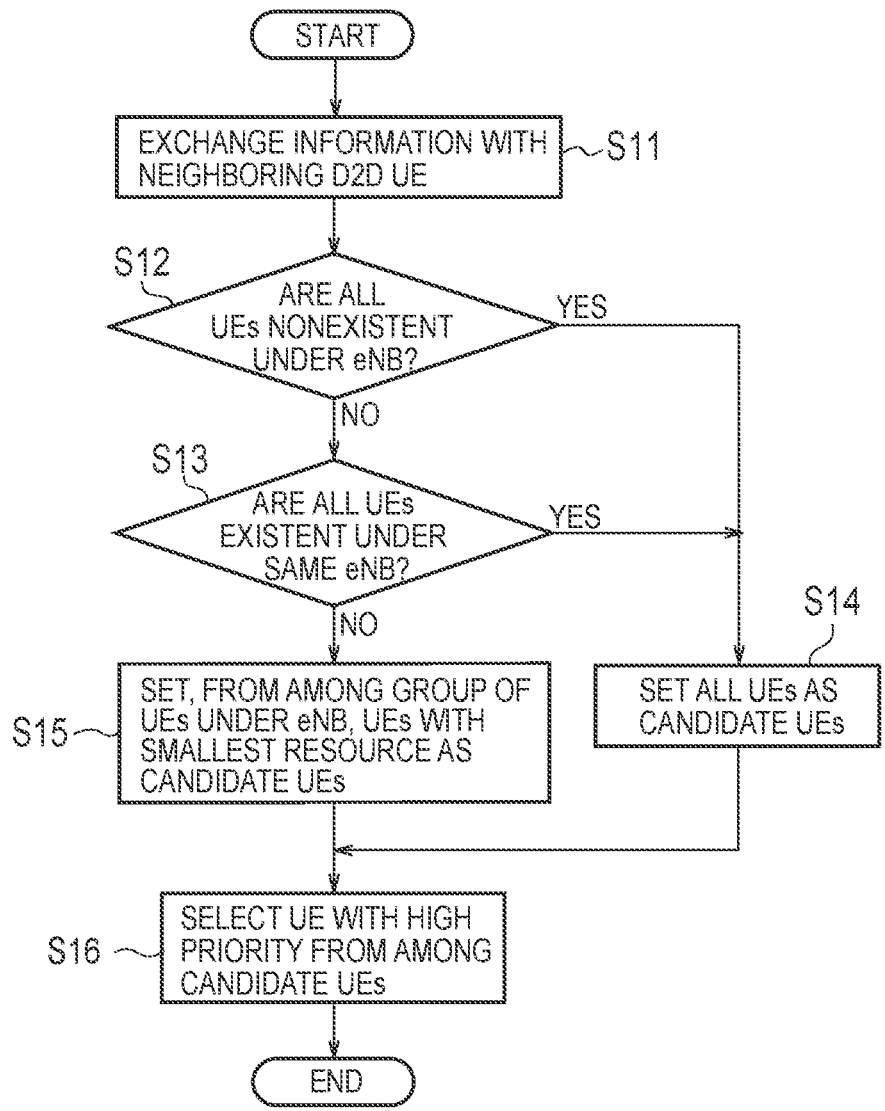
FIG. 8 is an operation flowchart according to the first embodiment.

FIG. 8 is an operation flowchart according to the first embodiment.

As illustrated in FIG. 8, in step S11, the UE 100-1 exchanges information with a neighboring UE 100 (the UE **100-*n***). Specifically, D2D usable resource information, coverage related information, and power source related information (hereinafter, these pieces of information are collectively referred to as "D2D UE information") are exchanged. In addition, the D2D UE information includes an identifier of a transmission source UE.

In step S12, the UE 100-1 determines, based on the coverage related information, whether all of the UEs 100-1 to **100-*n* are outside the coverage. When "YES" in step S12**, this case falls into the out of coverage case.

When "NO" in step S12, in step S13, the UE 100-1 determines, based on the coverage related information, whether the UEs 100-1 to **100-*n* exist in the same cell (or the eNB 200). In addition, when the cell is divided into sectors, the UE 100-1 may determine whether the UEs 100-1 to 100-*n*** exist in the same sector.

In addition, when "YES" in step S13, this case falls into the in coverage case inside the same cell. In addition, when "NO" in step S13, this case falls into the partial coverage case or the in coverage case in difference cells.

When "YES" in step S12 or when "YES" in step S13, in step S14, the UE 100-1 sets all of the UEs 100-1 to **100-*n*** as candidates for the control UE.

On the other hand, when "NO" in step S13, in step S15, based on the D2D usable resource information, the UE 100-1 sets, from among the UEs 100-1 to **100-*n*, UEs 100** inside the coverage (under the eNB) as candidates for the control UE.

In step S16, the UE 100-1 selects, from among the candidates for the control UE, a UE 100 with high priority set based on the power source related information, as the control UE. Specifically, the UE 100-1 selects, as the control UE, a UE 100 of which a drivable time corresponding to the power source related information is relatively long.

(3.2) Operation in in Coverage Case

Figure 9:
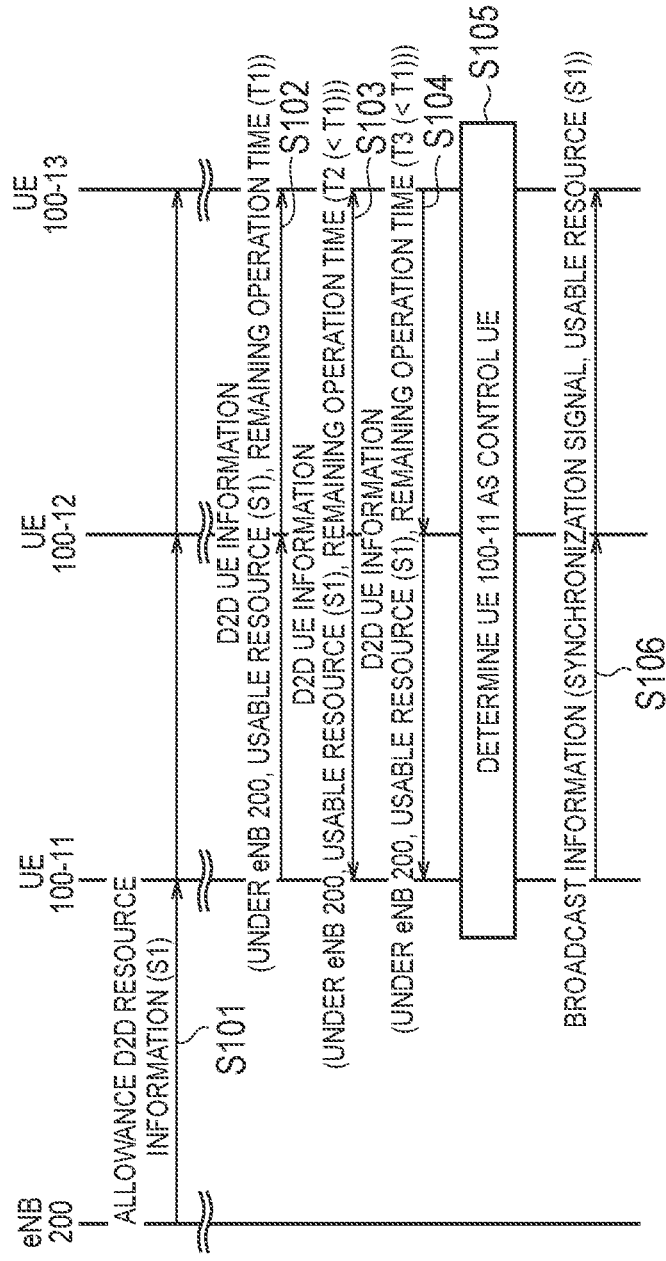
FIG. 9 is a sequence diagram illustrating an operation in an in coverage case according to the first embodiment.

FIG. 9 is a sequence diagram illustrating an operation in the in coverage case according to the first embodiment. In FIG. 9, all of UEs 100-11 to 100-13 exist in the same cell.

As illustrated in FIG. 9, in step S101, the eNB 200 notifies the UEs 100-11 to 100-13 of radio resource "S1" for allowing the use of D2D communication. The notification is performed by broadcast. All of the respective D2D usable resources of the UEs 100-11 to 100-13 are the radio resource "S1". In addition, after the control UE is once decided, in the D2D group, each UE 100 other than the control UE may notify the control UE of D2D usable resource information, and the control UE may determine a usable resource of a corresponding UE 100, and notify the corresponding UE 100 of the determined usable resource.

In steps S102 to S104, the UEs 100-11 to 100-13 notify one another of D2D UE information. The notification is performed by broadcast.

In step S105, the UEs 100-11 to 100-13 each select a control UE in accordance with the above-described operation flow. In this example, all of the UEs 100-11 to 100-13 exist in the same cell, and a drivable time of a power source (battery) of the UE 100-11 is the longest. Thus, the UE 100-11 is selected as the control UE.

In step S106, the UE 100-11 selected as the control UE transmits a broadcast signal.

Figure 10:
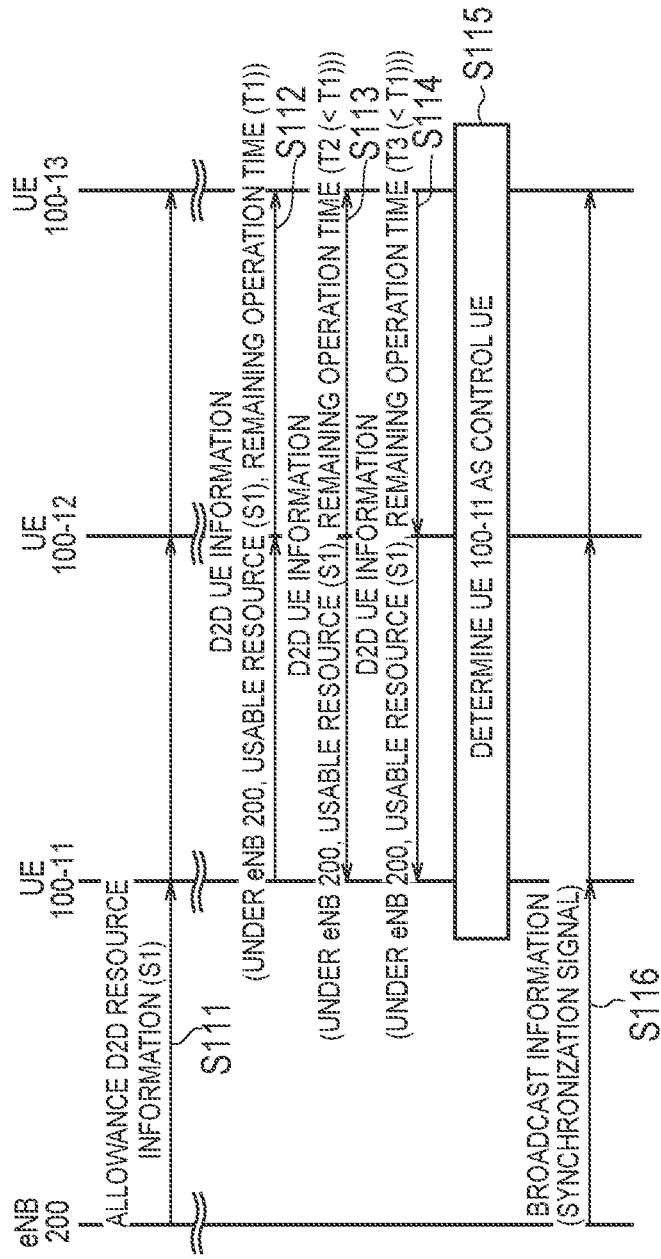
FIG. 10 is a sequence diagram illustrating a modified example of FIG. 9.

In addition, in FIG. 9, the control UE is assumed to serve as a synchronization reference in the D2D group. Nevertheless, in the in coverage case, the eNB 200 may serve as a synchronization reference in the D2D group. FIG. 10 is a sequence diagram illustrating a modified example of FIG. 9. As illustrated in FIG. 10, steps S111 to S115 are similar to corresponding steps in FIG. 9. On the other hand, FIG. 10 differs from FIG. 9 in that, in step S116, the eNB 200 transmits a synchronization signal to the UEs 100-11 to 100-13.

(3.3) Operation in Out of Coverage Case

Figure 11:
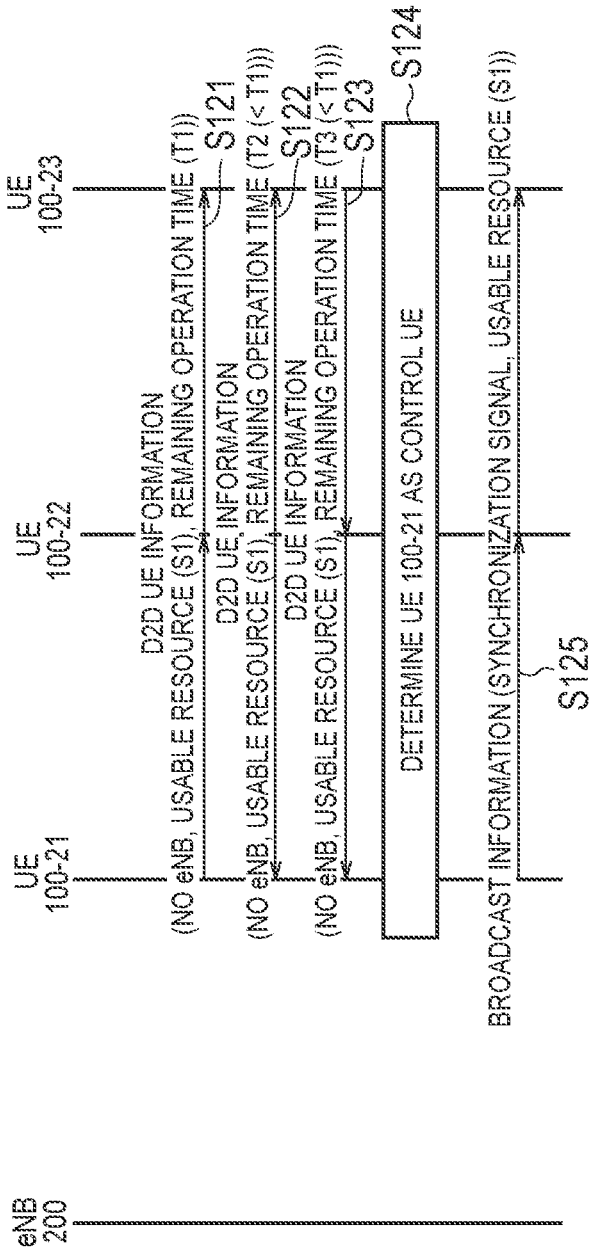
FIG. 11 is a sequence diagram illustrating an operation in an out of coverage case according to the first embodiment.

FIG. 11 is a sequence diagram illustrating an operation in the out of coverage case according to the first embodiment. In FIG. 11, all of UEs 100-21 to 100-23 are outside the coverage.

As illustrated in FIG. 11, in steps S121 to S123, the UEs 100-21 to 100-23 notify one another of D2D UE information. The notification is performed by broadcast.

In step S124, the UEs 100-21 to 100-23 each select a control UE in accordance with the above-described operation flow. In this example, all of the UEs 100-21 to 100-23 are outside the coverage, and a drivable time of a power source (battery) of the UE 100-21 is the longest. Thus, the UE 100-21 is selected as the control UE.

In step S125, the UE 100-21 selected as the control UE transmits a broadcast signal.

(3.4) Operation in Partial Coverage Case

Figure 12:
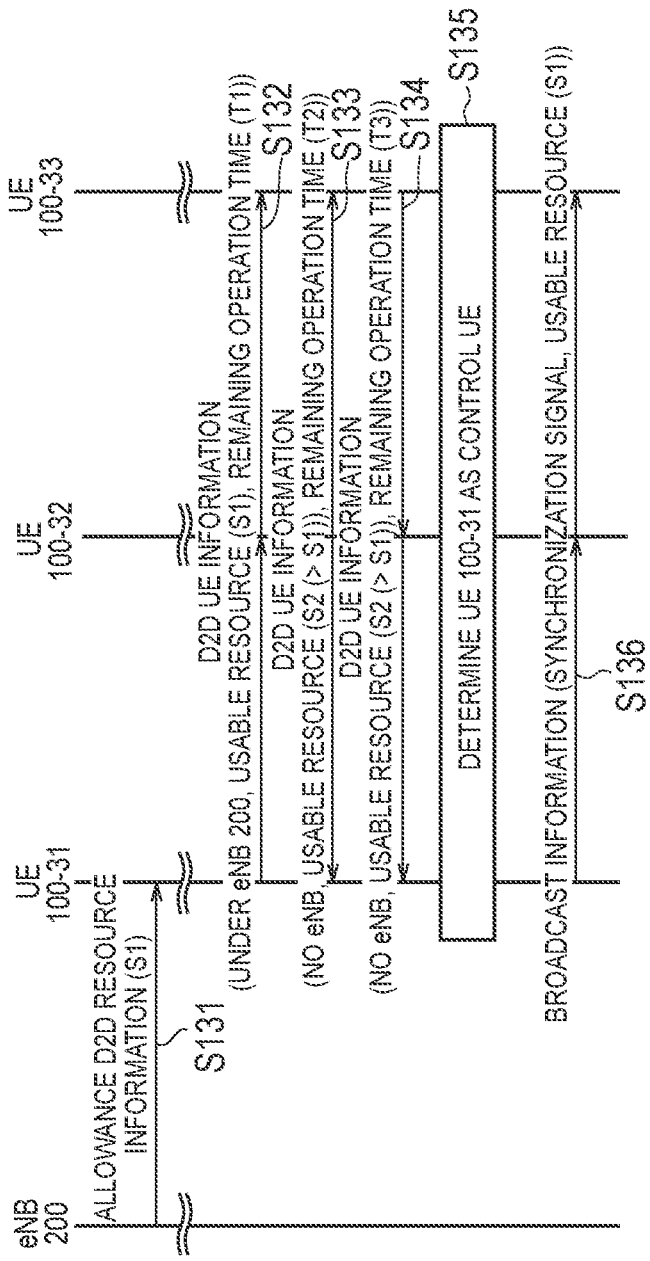
FIG. 12 is a sequence diagram illustrating an operation in a partial coverage case according to the first embodiment.

FIG. 12 is a sequence diagram illustrating an operation in the partial coverage case according to the first embodiment. In FIG. 12, the UE 100-31 exists in a cell of the eNB 200, and UEs 100-32 and 100-33 are both outside the coverage.

As illustrated in FIG. 12, in step S131, the eNB 200 notifies the UE 100-31 of radio resource "S1" for allowing the use of D2D communication. The notification is performed by broadcast. A D2D usable resource of the UE 100-31 is the radio resource "S1". On the other hand, each of the UEs 100-32 and 100-33 can use all radio resources "S2 (>S1)."

In steps S132 to S134, the UEs 100-31 to 100-33 notify one another of D2D UE information. The notification is performed by broadcast.

In step S135, the UEs 100-31 to 100-33 each select a control UE in accordance with the above-described operation flow. In this example, the D2D usable resource of the UE 100-31 is the smallest. Thus, the UE 100-31 is selected as the control UE.

In step S136, the UE 100-31 selected as the control UE transmits a broadcast signal.

(Summing-Up of First Embodiment)

In the first embodiment, by selecting, as a control UE, a UE 100 having a relatively small D2D usable resource (i.e., a UE 100 for which a D2D usable resource is specified), the interference between D2D communication and cellular communication can be effectively prevented.

In addition, in the first embodiment, in a case in which all of the plurality of UEs 100 is inside the coverage, or all of the plurality of UEs 100 is outside the coverage, among the plurality of UEs 100, a UE 100 having a power source with a relatively long drivable time is selected as a control UE. With this configuration, a UE 100 with a short drivable time can be prevented from becoming undrivable (operation stop).

Second Embodiment

The second embodiment will be described mainly based on a difference from the first embodiment. A system configuration and an operation environment according to the second embodiment are similar to those according to the first embodiment.

A method for selecting a control UE has been described in the first embodiment. In the second embodiment, a method for forming and managing a D2D group will be described.

(Operation According to Second Embodiment)

(1) Initial Formation of D2D Group

In the second embodiment, a step D of controlling, by the UE 100 that starts D2D communication, a transmission timing at which a discovery signal is transmitted, and a monitoring timing at which a discovery signal transmitted from another UE 100-2 is monitored, in a case in which a D2D group is not formed is further included. When the transmission and the monitoring of discovery signals are alternately performed, for example, a discovery signal is transmitted once in one second, and a discovery signal is monitored while a discovery signal is not transmitted.

In the step D, the UE 100 controls the transmission timing and the monitoring timing of discovery signals based on a synchronization signal transmitted from the eNB 200, or an operation timing set by the UE 100 itself. Specifically, in the case of being inside the coverage, the UE 100 controls the transmission timing and the monitoring timing of discovery signals based on a synchronization signal transmitted from the eNB 200. On the other hand, the case of being outside the coverage, the UE 100 controls the transmission timing and the monitoring timing of discovery signals based on an operation timing set by the UE 100 itself.

The UE 100 that has received a discovery signal at the monitoring timing transmits a participation request at a timing that is based on a reception timing of the discovery signal. With this configuration, synchronization with the transmission side of the discovery signal can be achieved. Then, triggered by the transmission and reception of the participation request, the above-described operations according to the first embodiment (steps A and B) are performed. The participation request includes D2D UE information. Alternatively, as described above, the discovery signal may include D2D UE information.

(2) Participation of UE in D2D Group

In the second embodiment, in a case in which a D2D group for performing D2D communication is formed, when a new UE 100 participates in the D2D group, the above-described operations according to the first embodiment (steps A and B) are performed. As a result, when the new UE 100 is more suitable as a control UE, the new UE 100 can be switched as a control UE. In addition, there is no need to exchange D2D UE information between all the UEs 100 in the D2D group. It is sufficient that D2D UE information is exchanged between the new UE 100 and the control UE.

Figure 13:
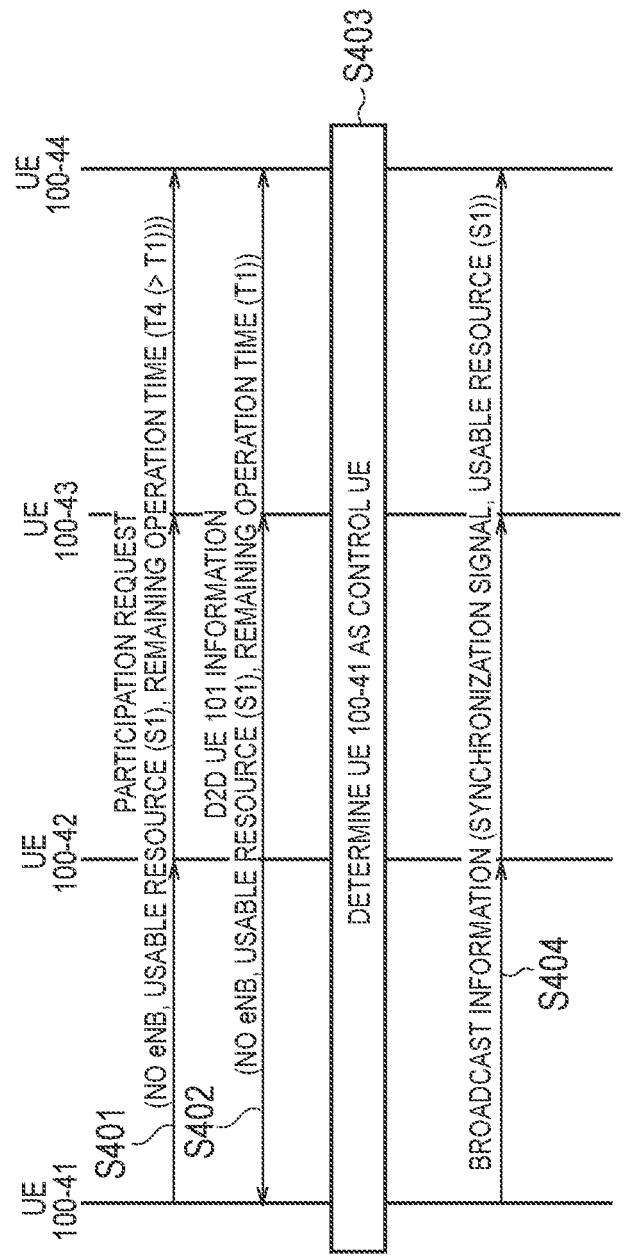
FIG. 13 is a sequence diagram illustrating an operation of a UE participating in a D2D group according to the second embodiment.

FIG. 13 is a sequence diagram illustrating an operation of a UE participating in a D2D group according to the second embodiment. In an initial state, UEs 100-42 to 100-44 form a D2D group, and the UE 100-42 among these UEs is a control UE. In addition, the out of coverage case is assumed.

As illustrated in FIG. 13, in step S401, the UE 100-41 transmits a participation request by broadcast. The participation request includes D2D UE information (D2D usable resource information, coverage related information, power source related information).

In step S402, the UE 100-42 that has received the participation request transmits D2D UE information by broadcast.

In step S403, the UEs 100-41 to 100-44 each select a control UE in accordance with the above-described operation flow according to the first embodiment. In this example, the UE 100-41 has a longer drivable time than that of the UE 100-42. Thus, the UE 100-41 is selected as the control UE.

In step S404, the UE 100-41 selected as the control UE transmits a broadcast signal.

(3) Checking UE Leaving from D2D Group

In the second embodiment, in a case in which a D2D group for performing D2D communication is formed, when it is checked that a part of UEs 100 forming the D2D group has left, the above-described operations according to the first embodiment (steps A and B) are performed. As a result, even in a case in which special connection for D2D communication is not set, it can be checked whether a part of UEs 100 has left.

For example, in a case in which a D2D group for performing D2D communication is formed, the control UE periodically transmits, by broadcast, a setting request (an update request) of the control UE. The UE 100 that has received the setting request of the control UE transmits D2D UE information. The control UE checks whether a part of UEs 100 has left, according to the reception status of D2D UE information. In addition, by periodically performing a setting request of the control UE, the control UE can be updated to an appropriate control UE according to the situation.

Alternatively, in a case in which a D2D group for performing D2D communication is formed, the control UE monitors a transmission frequency of another UE 100 in D2D communication, and transmits, by broadcast, the setting request (update request) of the control UE based on the variation degree of the transmission frequency. For example, when the control UE detects a UE 100 of which a transmission frequency has rapidly dropped, the control UE transmits, by broadcast, the setting request (update request) of the control UE.

(4) D2D Communication Operation

As described above, the control UE relays data transmitted and received between UEs 100 included in the D2D group. In addition, the control UE includes the number of UEs in the D2D group, in a broadcast signal. Each UE 100 decides a transmission timing based on the number of UEs in the D2D group and the order in which a corresponding UE 100 participates in the D2D group. For example, each UE 100 decides a transmission timing based on the control UE in the following manner. When there are two UEs, the control UE is in the first place and a UE 2 is in the second place in the priority order. If a new UE participates next, the UE is in the third place in the priority order. Alternatively, the control UE may define the respective orders of UEs 100 and notify the UEs 100 of the defined respective orders using a broadcast signal.

Figure 14:
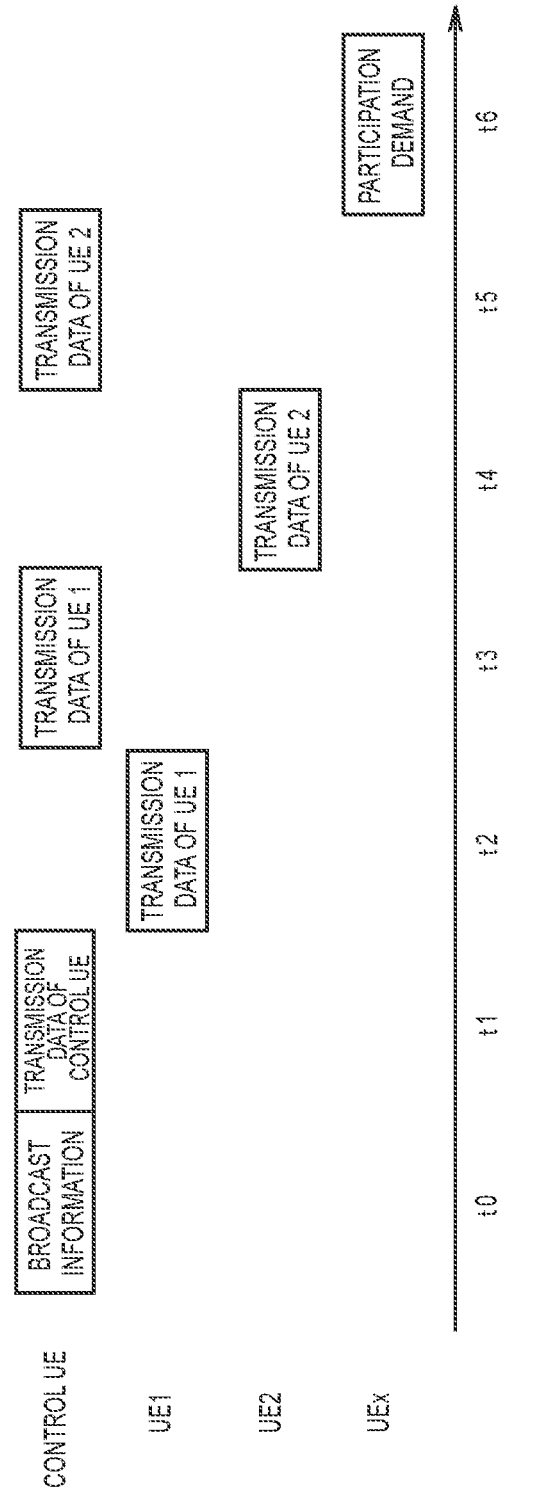
FIG. 14 is a timing chart illustrating a D2D communication operation according to the second embodiment.

FIG. 14 is a timing chart illustrating a D2D communication operation according to the second embodiment.

As illustrated in FIG. 14, when the number of UEs 100 forming a D2D group is three, a time t0 corresponds to a transmission timing of the control UE, a time t2 corresponds to a transmission timing of a UE 1, and a time t4 corresponds to a transmission timing of a UE 2. Times t1, t3, and t5 correspond to timings at which the control UE relays (retransmits) transmission data of the other UEs. The times t0 and t1 both correspond to the transmission timings of the control UE. This time t0 is set as a transmission timing of a broadcast signal (synchronization, resource, the number of UEs, etc.), or as a transmission timing of a participation request of a new UE.

Modified Example of First and Second Embodiments

In the above-described first and second embodiments, the eNB 200 performs the notification of radio resource for allowing the use of D2D communication, by broadcast. Alternatively, the notification may be performed by unicast or multicast. In addition, the exchange of D2D UE information in the D2D group is performed by broadcast. Alternatively, the exchange may be performed by unicast or multicast.

In the above-described first and second embodiments, D2D UE information includes three types of information: D2D usable resource information, coverage related information, and power source related information. Nevertheless, information included in the D2D UE information may be only any one of the D2D usable resource information, the coverage related information, and the power source related information.

In the above-described first and second embodiments, radio resource (frequency, time) usable for transmitting the discovery signal has not been mentioned. Nevertheless, radio resource (first radio resource) usable for transmitting the discovery signal may be predefined. In addition, when second radio resource usable for transmitting the discovery signal is separately allowed from the eNB 200, it is preferable that the UE 100 monitors the discovery signal at the monitoring timing for each of the first and second radio resources.

In the above-described first and second embodiments, an LTE system has been described as an example a mobile communication system. The present invention, however, is not limited to the LTE system. The present invention may be applied to a system other than the LTE system.

Third Embodiment

The third embodiment will be described mainly based on a difference from the first and second embodiments.

A D2D Proximity Service (D2D ProSe) is a service for enabling direct communication that is performed not via a network, in a synchronization cluster including a plurality of synchronized user terminals. The D2D Proximity Service includes a discovery process (Discovery) for discovering a neighboring terminal, and a communication process (Communication) for performing direct communication.

Meanwhile, in a mobile communication system, user terminals generally perform communication based on the control (or assistance) from a network. The D2D Proximity Service, however, is assumed to be usable even outside the coverage of the network. On the outside of the coverage of the network, the control (or assistance) from the network cannot be performed. It is therefore difficult to appropriately use the D2D Proximity Service. Thus, the following embodiment provides a user terminal and a method that can appropriately use the D2D Proximity Service even outside the coverage of the network.

(D2D Proximity Service)

The overview of the D2D Proximity Service (D2D ProSe) will be described below.

An LTE system according to the third embodiment supports the D2D Proximity Service. The D2D Proximity Service is a service for enabling direct communication that is performed not via a network, in a synchronization cluster including a plurality of synchronized user terminals. The D2D Proximity Service includes a discovery process (Discovery) for discovering a neighboring terminal, and a communication process (D2D Communication) for performing direct communication. The D2D communication is also referred to as direct communication.

A scenario in which all UEs 100 forming a synchronization cluster are positioned inside the cell coverage is referred to as "inside the coverage (in coverage)". A scenario in which all the UEs 100 forming a synchronization cluster are positioned outside the cell coverage is referred to as "outside the coverage (out of coverage)". A scenario in which a part of UEs 100 in the synchronization cluster is positioned inside the cell coverage, and a remaining UE 100 is positioned outside the cell coverage is referred to as "partial coverage".

Figure 15:
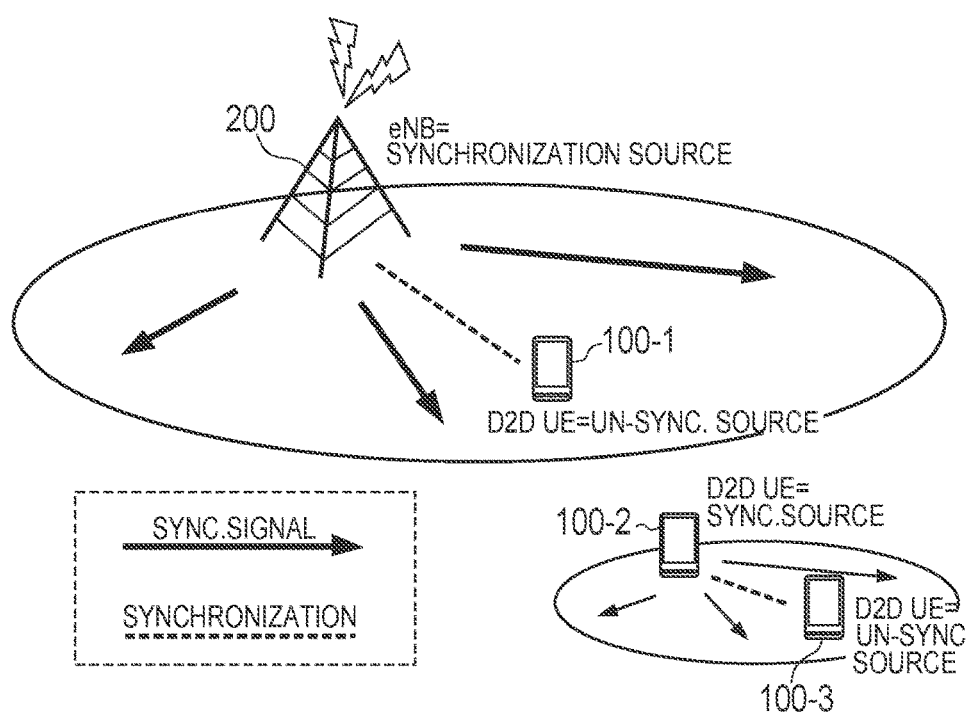
FIG. 15 is a diagram illustrating respective scenarios on inside and outside of a coverage according to third and fourth embodiments.

FIG. 15 is a diagram illustrating respective scenarios on the inside and outside of the coverage.

As illustrated in FIG. 15, on the inside of the coverage, the eNB 200 serves as a D2D synchronization source. In the third embodiment, the D2D synchronization source refers to a node transmitting a D2D synchronization signal (synchronization source). In addition, a D2D un-synchronization source refers to a node performing synchronization with the D2D synchronization source without transmitting a D2D synchronization signal (un-synchronization source).

On the inside of the coverage, the eNB 200 serving as a D2D synchronization source transmits, using a broadcast signal, D2D resource information indicating radio resource usable for the D2D Proximity Service. The D2D resource information includes information indicating radio resource for discovery (hereinafter, referred to as "discovery resource") and information indicating radio resource for D2D communication (hereinafter, referred to as "communication resource").

The UE 100-1 serving as a D2D un-synchronization source performs discovery and D2D communication based on the D2D resource information received from the eNB 200.

On the other hand, on the outside of the coverage, the eNB 200 cannot perform the above-described operation. Thus, a certain UE 100 (UE 100-2 in FIG. 15) serves as a D2D synchronization source. The UE 100-2 serving as a D2D synchronization source transmits D2D resource information using a broadcast signal. The UE 100-3 serving as a D2D un-synchronization source performs discovery and D2D communication based on the D2D resource information received from the UE 100-2.

Here, the UE 100 cannot acquire D2D resource information from the eNB 200 on the outside of the coverage. This leads to a problem in the method of deciding D2D resource information to be used outside the coverage.

As a method for deciding D2D resource information to be used outside the coverage, a following method can be conceived. Specifically, in the method, the UE 100 stores D2D resource information allocated from the eNB 200 on the inside of the coverage, and uses the D2D resource information on the outside of the coverage.

Nevertheless, on the outside of the coverage, a plurality of UEs 100 to which different pieces of D2D resource information are allocated by different eNBs 200 is assumed to exist. For example, if UEs 100 execute discovery based on different pieces of discovery resource information, different discovery resources are used for the transmission and reception. In such a case, there is concern that the complexity of discovery reception may increase, and discovery may fail. It is therefore difficult to appropriately use the D2D Proximity Service on the outside of the coverage.

(Broadcast Synchronization Information)

Broadcast synchronization information transmitted by the D2D synchronization source will be described below. The broadcast synchronization information is information necessary for performing synchronization, discovery, and D2D communication.

In the third embodiment, the broadcast synchronization information includes a D2D synchronization signal (D2DSS) and a physical D2D synchronization channel (PD2DSCH).

The D2DSS is a signal for providing synchronization references of time and frequency. The D2DSS may be formed so that an identifier or a type of a D2D synchronization source can be identified. The D2DSS may include a primary D2DSS (PD2DSS) and a secondary D2DSS (SD2DSS).

The PD2DSCH is a physical channel for carrying larger amount of information than the D2DSS does. The PD2DSCH carries an identifier or a type of a D2D synchronization source and the above-described D2D resource information. Alternatively, the PD2DSCH may be unnecessitated by associating the D2D resource information with the D2DSS.

(Operation According to Third Embodiment)

(1) Operation Overview

In the third embodiment, the UE 100 stores D2D resource information received from the D2D synchronization source (the eNB 200 or the UE 100). When the UE 100 becomes a D2D synchronization source on the outside of the coverage, the UE 100 transmits the stored D2D resource information by broadcast. More specifically, the UE 100 transmits the D2D resource information with the D2D resource information included in the above-described broadcast synchronization information.

On the other hand, when the UE 100 becomes a D2D un-synchronization source performing synchronization with the D2D synchronization source, the UE 100 rewrites the stored D2D resource information using the D2D resource information received from the D2D synchronization source. More specifically, the UE 100 rewrites the stored D2D resource information using the D2D resource information included in the broadcast synchronization information received from the D2D synchronization source, and performs discovery (and D2D communication) based on the rewritten D2D resource information.

With this configuration, even if D2D resource information stored by the UE 100 serving as a D2D un-synchronization source is different from D2D resource information stored by another UE 100 serving as a D2D synchronization source, on the outside of the coverage, the UE 100 can perform discovery (and D2D communication) according to the D2D resource information stored by the other UE 100 serving as a D2D synchronization source. For example, the UEs 100 can execute discovery based on the same discovery resource information, and the same discovery resource can be used for the transmission and reception.

In addition, the UE 100 needs to decide whether the UE 100 itself serves as a D2D synchronization source or a D2D un-synchronization source on the outside of the coverage.

In the third embodiment, the UE 100 receives, from another UE 100, priority information indicating the degree of suitability for a D2D synchronization source. By comparing the received priority information with predetermined information, the UE 100 determines whether to set the other UE 100 as a D2D synchronization source or set the UE 100 itself as a D2D synchronization source. The predetermined information is priority information of the UE 100 itself or a reference value acquired from a network.

In addition, in the third embodiment, the UE 100 transmits, by broadcast, priority information indicating the degree of suitability for a D2D synchronization source. The priority information of the UE 100 itself is based on at least one of the specification of the UE 100 itself, the movement state of the UE 100 itself, and the reliability of D2D resource information stored in a storage.

Figure 16:
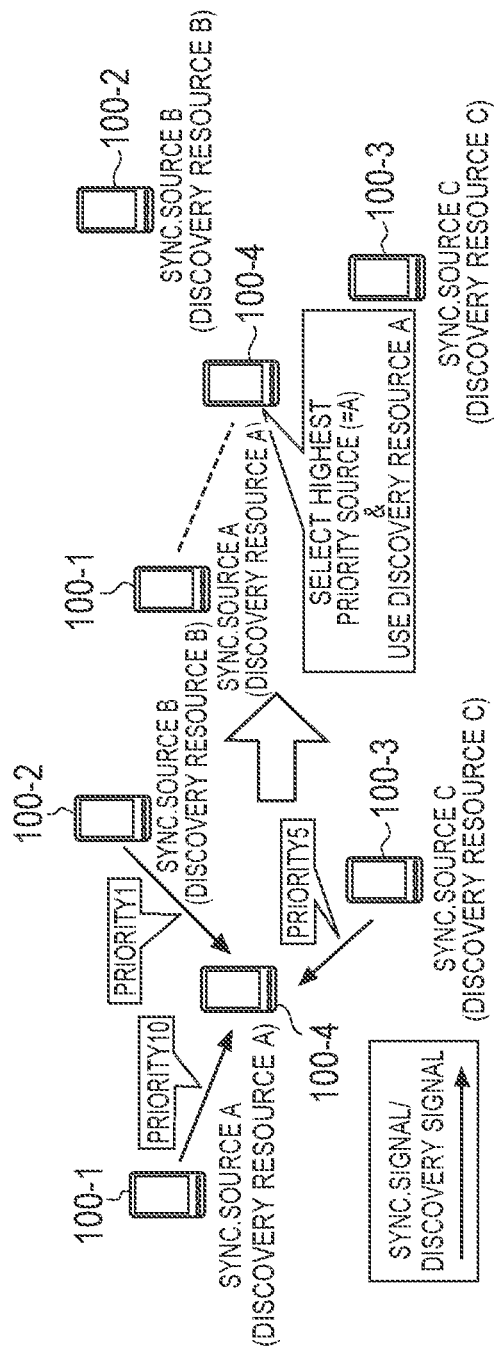
FIG. 16 is a diagram illustrating an operation overview according to the third embodiment.

FIG. 16 is a diagram illustrating an operation overview according to the third embodiment.

As illustrated in FIG. 16, in the initial state, the UEs 100-1 to 100-3 each serve as a D2D synchronization source and transmit broadcast synchronization information. In addition, the UEs 100-1 to 100-3 transmit their respective pieces of priority information with the pieces of priority information included in their respective pieces of broadcast synchronization information.

The priority information of the UE 100-1 is "Priority 10", the priority information of the UE 100-2 is "Priority 1", and the priority information of the UE 100-3 is "Priority 5". The UE 100-4 receives the broadcast synchronization information from each of the UEs 100-1 to 100-3.

The UE 100-4 compares the respective pieces of priority information of the UEs 100-1 to 100-3 with one another, and selects the UE 100 with the highest priority. Since the priority of the UE 100-1 with "Priority 10" is the highest, the UE 100-4 selects the UE 100-1, and sets the UE 100-1 as a D2D synchronization source of the UE 100 itself. In addition, in this process, the priority information of the UE 100-4 is not considered.

In this case, the UE 100-4 rewrites D2D resource information stored by the UE 100 itself, using D2D resource information included in broadcast synchronization information of the UE 100-1. The UE 100-4 performs discovery (and D2D communication) according to the D2D resource information included in the broadcast synchronization information of the UE 100-1.

In addition, the UEs 100-1 and 100-4 form one synchronization cluster, and the UE 100-1 serves as a synchronization source UE (synchronization cluster head, control UE) in the synchronization cluster.

In addition, the description has been given of an example case in which priority information is included in broadcast synchronization information. Alternatively, instead of including priority information in broadcast synchronization information, or in addition to including priority information in broadcast synchronization information, priority information may be included in a discovery signal.

(2) Priority Information

The priority information of the UE 100 is based on at least one of the specification of the UE 100, the movement state of the UE 100, and the reliability of D2D resource information stored in a storage. More specifically, for deciding priority information, at least one of the following parameters is used.

Whether a UE 100 is inside the coverage: Higher priority is given to a UE 100 inside the coverage as compared with a UE 100 outside the coverage.

The time when D2D resource information is acquired from a D2D synchronization source inside the coverage (the eNB 200, the UE 100 inside the coverage): As an elapsed time from the time when D2D resource information is acquired from a D2D synchronization source inside the coverage is longer, lower priority is given.

UE ID, ProSe ID, and Application ID: As for the UE ID and the ProSe ID, a setting of giving synchronization source priority to a UE 100 having a specific UE ID (ProSe ID) such as, for example, a UE of a commander of an army and a UE of a captain of fire crews is used. In addition, as for the Application ID, when a specific application such as, for example, Public Safety and telephone call is planned to be used, higher priority is given to a UE so that the UE preferentially becomes a synchronization source.

Whether a UE 100 is a high power UE: Higher priority is given to a UE 100 having large maximum transmission power.

The number of times a UE 100 connects to a D2D synchronization source outside the coverage: As the number of times a UE 100 connects to a D2D synchronization source outside the coverage is larger, the reliability of D2D resource information is considered to be lower. Thus, lower priority is given to the UE 100. In addition, when D2D resource information is acquired from a D2D synchronization source inside the coverage, the number is reset.

Whether a UE 100 has a global positioning system (GPS): Since the time accuracy of a UE 100 having a GPS (GNSS) is considered to be higher, higher priority is given.

UE category: Higher priority is given to a UE 100 belonging to a category with high communications capacity.

Supported release: As the release of a standard with which a UE 100 complies is more recent, higher priority is given.

Movement state (speed information): As the movement speed of a UE 100 is higher, lower priority is given.

(3) D2D Resource Information Rewrite Determination

The UE 100 executes D2D resource information rewrite determination at one or more timings of the following timings.

A timing at which a UE 100 receives broadcast synchronization information (D2D synchronization signal and D2D resource information) from the eNB 200, i.e., a timing at which the E 100 comes inside the coverage.

A timing at which the UE 100 receives broadcast synchronization information from another UE 100.

A timing at which the UE 100 receives a discovery signal from another UE 100.

In addition, the UE 100 that serves as a D2D synchronization source and is executing D2D communication does not have to update D2D resource information. In this case, the UE 100 continues to be a D2D synchronization source during communication. If new D2D communication does not occur for a certain time period or longer after the communication ends, D2D resource information is updated.

(4) Operation of D2D Synchronization Source

At a timing at which transmission or reception is not performed, the UE 100 serving as a D2D synchronization source may receive priority information from another UE 100, and determine whether to continue to be a D2D synchronization source or stop being a D2D synchronization source (i.e., the transmission of broadcast synchronization information).

Figure 17:
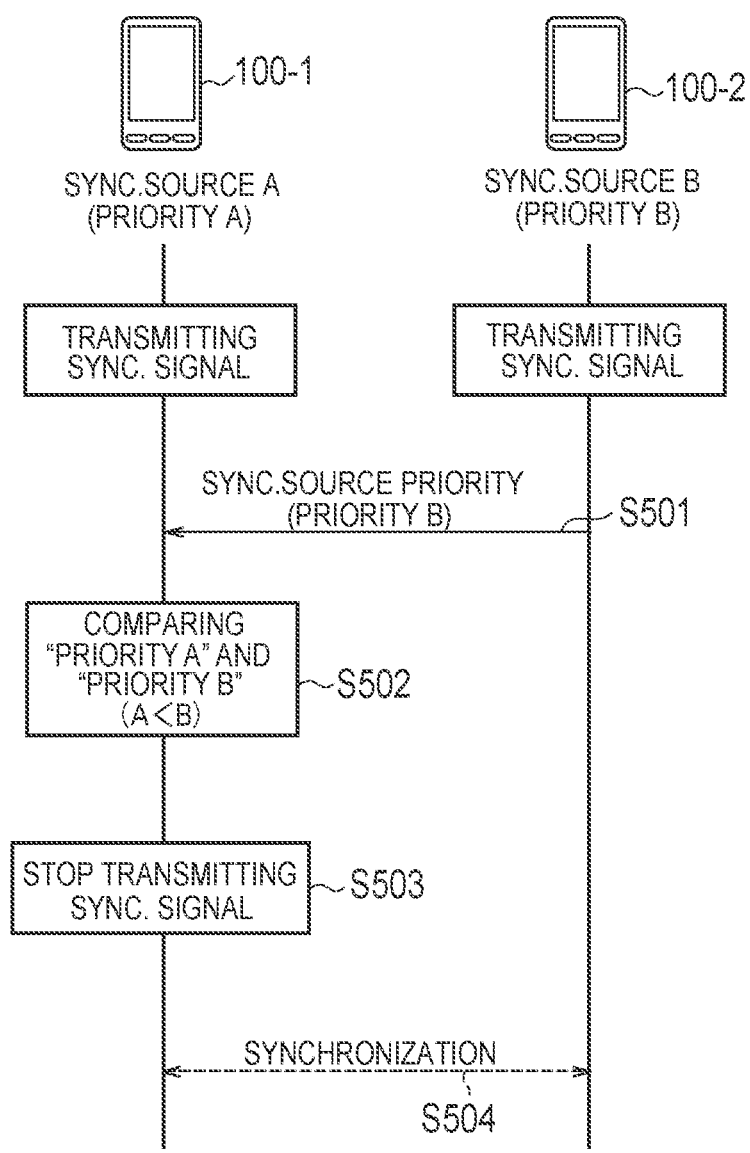
FIG. 17 is a sequence diagram illustrating an operation of a D2D synchronization source UE according to the third embodiment.

FIG. 17 is a sequence diagram illustrating an operation of the UE 100 serving as a D2D synchronization source according to the third embodiment. In the initial state in FIG. 17, the UEs 100-1 and 100-2 each serve as a D2D synchronization source and transmit broadcast synchronization information.

As illustrated in FIG. 17, in step S501, the UE 100-2 transmits priority information "Priority B" of the UE 100-2 itself. The UE 100-1 receives the priority information "Priority B" of the UE 100-2.

In step S502, the UE 100-1 compares the priority information "Priority B" of the UE 100-2 with priority information "Priority A" of the UE 100-1 itself. In this example, the description will be given assuming that the priority information "Priority B" of the UE 100-2 is higher than the priority information "Priority A" of the UE 100-1 itself.

In step S503, the UE 100-1 stops being a D2D synchronization source, i.e., stops transmitting broadcast synchronization information.

In step S504, the UE 100-1 sets the UE 100-2 as a synchronization source UE of the UE 100-1 itself, and performs synchronization with the UE 100-2.

In addition, in this sequence, priority information of another UE is compared with its own priority information. Nevertheless, the comparison performed here is not limited to the comparison with own priority information. The priority information may be compared with a reference value acquired from a network. The reference value acquired from a network is a threshold value preset by an AS, an NAS, and the like, for example.

(5) Operation of D2D Un-Synchronization Source

When D2D resource information is not acquired from a D2D synchronization source inside the coverage, the UE 100 serving as a D2D un-synchronization source first searches for broadcast synchronization information (and discovery signal). Alternatively, the UE 100 serving as a D2D un-synchronization source becomes a D2D synchronization source before searching, and is prohibited from transmitting broadcast synchronization information (and discovery signal).

The UE 100 serving as a D2D un-synchronization source may determine whether to become a D2D synchronization source, based on received priority information, or when broadcast synchronization information has failed to be received from another UE 100.

Figure 18:
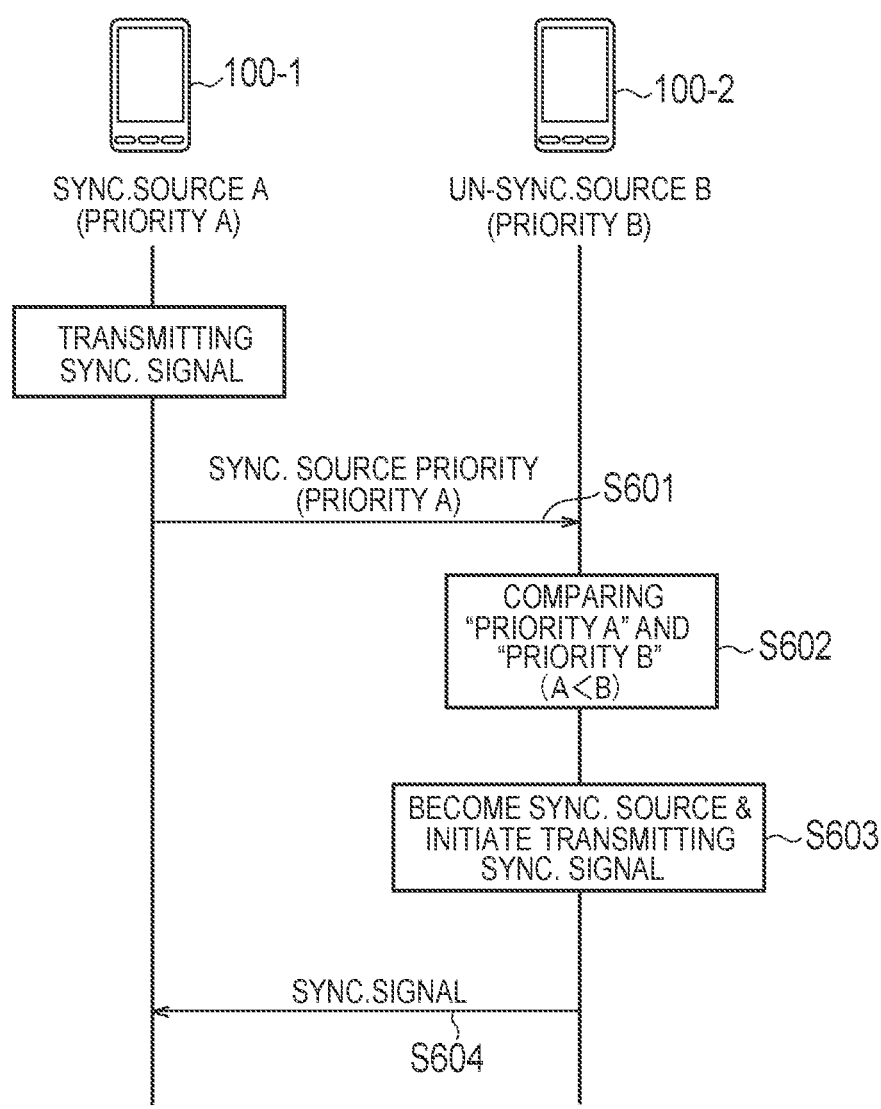
FIG. 18 is a sequence diagram illustrating an operation of a D2D un-synchronization source UE according to the third embodiment.

FIG. 18 is a sequence diagram illustrating an operation of the UE 100 serving as a D2D un-synchronization source according to the third embodiment. In the initial state in FIG. 18, the UE 100-1 serves as a D2D synchronization source, and the UE 100-2 serves as a D2D un-synchronization source.

As illustrated in FIG. 18, in step S601, the UE 100-1 transmits priority information "Priority A" of the UE 100-1 itself. The UE 100-2 receives the priority information "Priority A" of the UE 100-1.

In step S602, the UE 100-2 compares the priority information "Priority A" of the UE 100-1 with priority information "Priority B" of the UE 100-2 itself. In this example, the description will be given assuming that the priority information "Priority B" of the UE 100-2 is higher than the priority information "Priority A" of the UE 100-1.

In step S603, the UE 100-2 becomes a D2D synchronization source, i.e., initiates transmitting broadcast synchronization information.

In step S604, the UE 100-2 transmits broadcast synchronization information.

In addition, in this sequence, priority information of another UE is compared with its own priority information. Nevertheless, the comparison performed here is not limited to the comparison with own priority information. The priority information may be compared with a reference value acquired from a network. The reference value acquired from a network is a threshold value preset by an AS, an NAS, and the like, for example.

Fourth Embodiment

The fourth embodiment will be described mainly based on a difference from the first to third embodiments.

(Multi-Hop Synchronization Scheme)

As described above, the UE 100 serving as a D2D synchronization source, i.e., a synchronization cluster head (SCH) UE 100 provides information necessary for executing synchronization, discovery, and D2D communication, using the D2DSS and the PD2DSCH. By receiving the D2DSS transmitted from the D2D synchronization source (SCH), a UE 100 acquires time and frequency synchronization references. Furthermore, when executing discovery and D2D communication, the UE 100 needs to recognize a resource used by another UE 100 located close to the UE 100. Thus, radio resources (resource pools) for discovery and D2D communication need to be provided. In addition, since the UE 100 may receive a plurality of D2DSSs transmitted from different SCHs, SCH-related information should be transmitted. As the SCH-related information, a D2D synchronization source identifier and a D2D synchronization source type are considered. The D2D synchronization source should notify a UE 100 of these types of information using the D2DSS, the PD2DSCH, and other means. Table 1 lists pieces of information to be provided by the D2D synchronization source.

TABLE 1

Time/frequency synchronization reference
Bandwidth
SFN information
D2D resource pool
    Discovery resource pool
    Communication resource pool
Synchronization source related information
    PD2DSCH transmission periodicity and offset
    Synchronization source type
        In-Coverage Synchronization source
        Synchronization Cluster Head (SCH)
        (Out-of-Coverage) Synchronization source
    Synchronization source ID
    Number of hop In the fourth embodiment, a case of introducing a multi-hop synchronization scheme will be described. The multi-hop synchronization scheme is a scheme in which the UE 100 multi-hop transfers broadcast synchronization information (D2DSS and PD2DSCH) acquired from the eNB 200 or a SCH UE 100.

Figure 19:
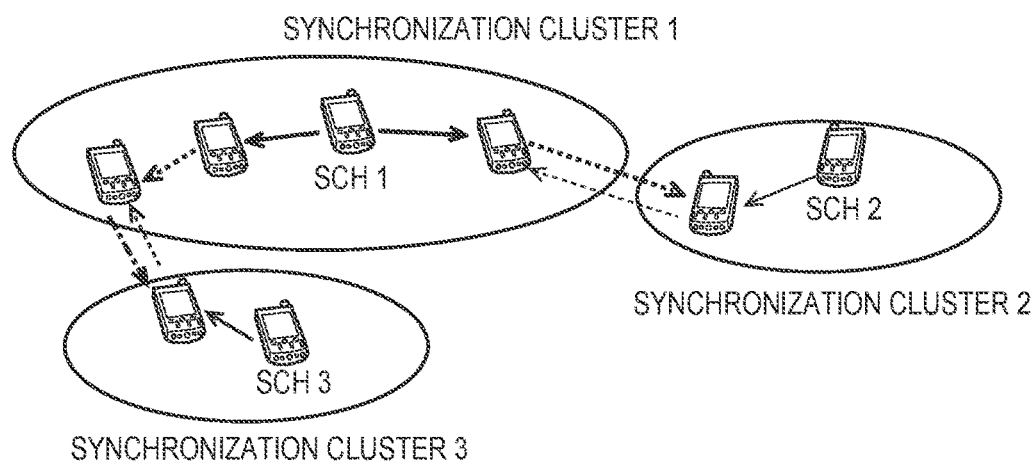
FIG. 19 is a diagram illustrating a multi-hop synchronization scheme in an out-of-coverage scenario according to the fourth embodiment.

FIG. 19 is a diagram illustrating the multi-hop synchronization scheme in an out-of-coverage scenario. As illustrated in FIG. 19, in each of a plurality of synchronization clusters 1 to 3, broadcast synchronization information transmitted by a SCH UE is transferred by another UE in a corresponding synchronization cluster. As a result, even a UE that cannot directly receive broadcast synchronization information from a SCH UE can be synchronized with UEs under the SCH UE, and execute discovery and D2D communication.

Figure 20:
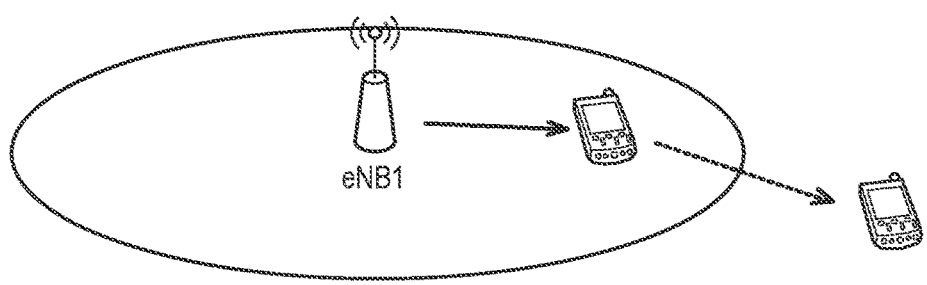
FIG. 20 is a diagram illustrating a multi-hop synchronization scheme in a partial-coverage scenario according to the fourth embodiment.

FIG. 20 is a diagram illustrating the multi-hop synchronization scheme in a partial-coverage scenario. As illustrated in FIG. 20, broadcast synchronization information transmitted by an eNB 1 is transferred by a UE inside the coverage. As a result, even an out-of-coverage UE that cannot directly receive broadcast synchronization information from the eNB 1 can be synchronized with the UE under the eNB 1, and execute discovery and D2D communication.

(Operation According to Fourth Embodiment)

(1) Operation Overview

Figure 21:
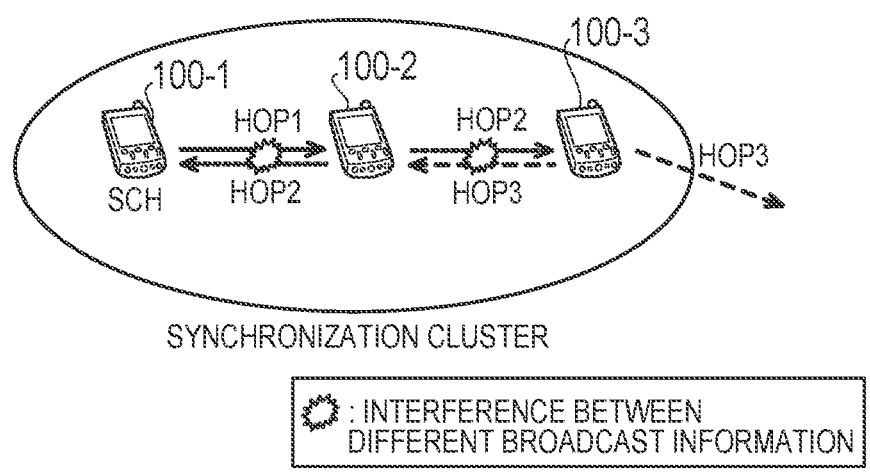
FIG. 21 is a diagram illustrating a transfer method of broadcast synchronization information (D2D synchronization signal (D2DSS) and physical D2D synchronization channel (PD2DSCH)) in a multi-hop synchronization scheme according to the fourth embodiment.

FIG. 21 is a diagram illustrating a transfer method of broadcast synchronization information (D2DSS and PD2DSCH) in the multi-hop synchronization scheme.

As illustrated in FIG. 21, when broadcast synchronization information is transferred, interference is considered to occur between broadcast synchronization information before transfer and broadcast synchronization information after transfer. In FIG. 21, interference occurs between broadcast synchronization information (hop 1) transmitted by the UE 100-1 serving as a D2D synchronization source (SCH) and broadcast synchronization information (hop 2) transferred by the UE 100-2. In addition, interference occurs between the broadcast synchronization information (hop 2) transferred by the UE 100-2 and broadcast synchronization information (hop 3) transferred by the UE 100-3. It is therefore preferable to introduce a transfer method that gives consideration to interference.

The transfer method of broadcast synchronization information according to the fourth embodiment will be described below. Initially, the description will be given with the focus placed on the UE 100-2.

First, the UE 100-2 receives the broadcast synchronization information (hop 1) multi-hop transferred from the D2D synchronization source (SCH UE 100-1).

Secondly, the UE 100-2 transfers transmission broadcast synchronization information (hop 2) corresponding to the received broadcast synchronization information (hop 1), to another UE 100-3. Here, the UE 100-2 applies a transmission parameter different from a transmission parameter applied to the received broadcast synchronization information (hop 1), to the transmission broadcast synchronization information (hop 2). The transmission parameter is at least either one of a signal sequence or time and frequency resources.

More specifically, the transmission parameter in broadcast synchronization information is associated with the hop number of the broadcast synchronization information from the D2D synchronization source (SCH UE 100-1). In addition, the broadcast synchronization information (hop 1) received by the UE 100-2 includes information about the hop number from the D2D synchronization source. The UE 100-2 applies a transmission parameter corresponding to the hop number, to the transmission broadcast synchronization information (hop 2).

The UE 100-3 also performs operations similar to those performed by the UE 100-2. More specifically, the broadcast synchronization information (hop 2) received by the UE 100-3 includes information about the hop number from D2D synchronization source. The UE 100-2 applies a transmission parameter corresponding to the hop number, to the transmission broadcast synchronization information (hop 3).

(2) D2DSS

Next, the description will be given of a specific example of a transmission parameter in broadcast synchronization information that is to be applied to a D2DSS.

One method for suppressing the interference between D2DSSs is to change a signal sequence (an orthogonal sequence) of a D2DSS for each hop, for example Examples of the signal sequence include a Zadoff Chu sequence and an M sequence. With this configuration, signal sequences of D2DSSs transmitted by the UEs 100-1 to 100-3 can be made different from one another. Thus, D2DSSs can be multiplexed by code division multiplexing.

(3) PD2DSCH

Next, the description will be given of a specific example of a transmission parameter in broadcast synchronization information that is to be applied to a PD2DSCH.

Figure 22:
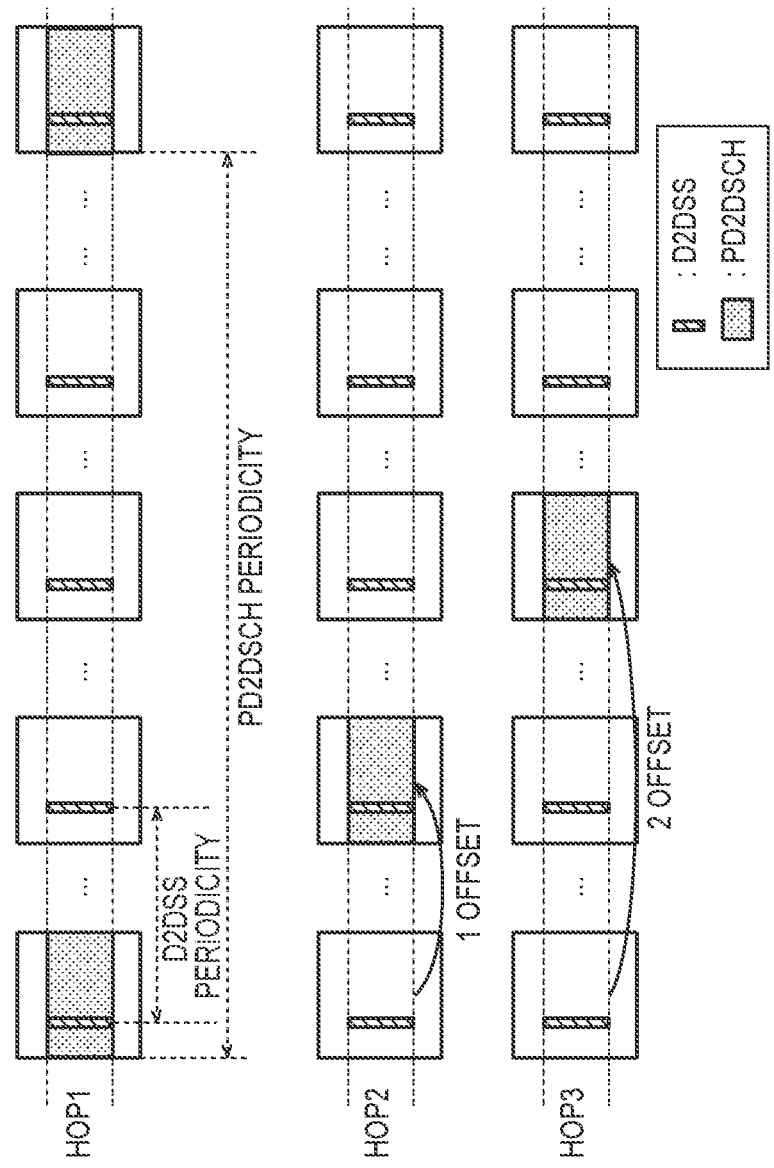
FIG. 22 is a diagram illustrating a method for suppressing the interference between PD2DSCHs according to the fourth embodiment.

A method for suppressing the interference between PD2DSCHs is to change a transmission resource of a PD2DSCH for each hop. FIG. 22 is a diagram illustrating a method for suppressing the interference between PD2DSCHs.

As illustrated in FIG. 22, the offset of the transmission periodicity of PD2DSCHs is changed according to the hop number. For example, the transmission periodicity of PD2DSCHs is set to be an integer multiple of the transmission periodicity of D2DSSs, and the offset varying according to each hop number is given to the transmission timings of PD2DSCHs. With this configuration, PD2DSCH transmission timings of the UEs 100-1 to 100-3 can be made different from one another. Thus, D2DSSs can be multiplexed by time division multiplexing.

Modified Example of Third and Fourth Embodiments

In the fourth embodiment, the UE 100 may decide a transmission parameter to be applied to transmission broadcast synchronization information, by scanning broadcast synchronization information transmitted from another UE 100. For example, the UE 100 scans broadcast synchronization information transmitted from another UE 100, determines a transmission parameter of the broadcast synchronization information, and selects a transmission parameter different from the transmission parameter. Then, the UE 100 applies the selected transmission parameter to broadcast synchronization information, and transmits the broadcast synchronization information.

The above-described third and fourth embodiments may be executed in combination with the first and second embodiments.

In the above-described third and fourth embodiments, an LTE system has been described as an example a mobile communication system. The present invention, however, is not limited to the LTE system. The present invention may be applied to a system other than the LTE system.

CROSS-REFERENCE

Japanese Patent Application No. 2013-202767 (filed on Sep. 27, 2013) and Japanese Patent Application No. 2014-014915 (filed on Jan. 29, 2014) are incorporated by reference herein in its entirety.

INDUSTRIAL APPLICABILITY

The present invention is useful in a mobile communication field.

The invention claimed is:
1. A first user terminal, comprising:
a controller, wherein
when the first user terminal is out of coverage of a base station, the controller is configured to:
determine whether a global navigation satellite system (GNSS) is available in the first user terminal,
determine a first priority based on whether the GNSS is available,
directly receive synchronization information from a second user terminal, the synchronization information received from the second user terminal including information indicating whether the second user terminal is in the coverage,
determine a second priority based on:
the information received from the second user terminal; and a power of the synchronization signal received from the second user terminal, directly receive synchronization information from a third user terminal, the synchronization information received from the third user terminal including information indicating whether the third user terminal is in the coverage, determine a third priority based on:
  the information received from the third user terminal; and
  a power of the synchronization signal received from the third user terminal, and determine whether to select one of the second user terminal and the third user terminal as a synchronization reference of the first user terminal, based on the first priority, the second priority, and the third priority.

2. The first user terminal according to claim 1, wherein the controller is configured to:

determine to select the second user terminal as the synchronization reference of the first user terminal, in response to the second priority being higher than the first priority and the third priority, and determine not to select the second user terminal as the synchronization reference of the first user terminal, in response to the first priority or the third priority being higher than the second priority.

3. A chipset for a first user terminal, comprising:
at least one processor, wherein
when the first user terminal is out of coverage of a base station, the at least one processor is configured to cause the first user terminal to:

determine whether a global navigation satellite system (GNSS) is available in the first user terminal, determine a first priority based on whether the GNSS is available, directly receive synchronization information from a second user terminal, the synchronization information received from the second user terminal including information indicating whether the second user terminal is in the coverage, determine a second priority based on:
  the information received from the second user terminal; and
  a power of the synchronization signal received from the second user terminal, directly receive synchronization information from a third user terminal, the synchronization information received from the third user terminal including information indicating whether the third user terminal is in the coverage, determine a third priority based on:
  the information received from the third user terminal; and
  a power of the synchronization signal received from the third user terminal, and determine whether to select one of the second user terminal and the third user terminal as a synchronization reference of the first user terminal, based on the first priority, the second priority, and the third priority.

* * * * *